(12) United States Patent
Kasamatsu et al.

(10) Patent No.: US 11,843,749 B2
(45) Date of Patent: Dec. 12, 2023

(54) IMAGE PROCESSING APPARATUS AND CONTROL METHOD THEREOF, IMAGE READING APPARATUS, AND A NON-TRANSITORY COMPUTER-READABLE STORAGE MEDIUM COMPRISING A SUB-SCANNING DIRECTION PROCESSING UNIT CONFIGURED TO PERFORM REDUCTION PROCESSING, AND A MAIN-SCANNING DIRECTION PROCESSING UNIT TO CONNECT DATA AFTER REDUCTION PROCESSING AND REDUCES THE CONNECTED DATA

(71) Applicant: CANON KABUSHIKI KAISHA, Tokyo (JP)

(72) Inventors: Takehiko Kasamatsu, Kanagawa (JP); Katsutoshi Miyahara, Kanagawa (JP); Tomoya Teraji, Tokyo (JP); Shota Nonaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/148,891

(22) Filed: Dec. 30, 2022

(65) Prior Publication Data
US 2023/0224420 A1  Jul. 13, 2023

(30) Foreign Application Priority Data
Jan. 12, 2022 (JP) ................. 2022-003252

(51) Int. Cl.
*H04N 1/393* (2006.01)
*H04N 1/03* (2006.01)
*H04N 1/38* (2006.01)

(52) U.S. Cl.
CPC ............. *H04N 1/3935* (2013.01); *H04N 1/03* (2013.01)

(58) Field of Classification Search
CPC ...... H04N 1/03; H04N 1/0473; H04N 1/1903; H04N 1/1934; H04N 1/3935;
(Continued)

(56) References Cited

U.S. PATENT DOCUMENTS

| 2008/0024823 A1* | 1/2008 | Nakagawa ........... H04N 1/3878 358/1.16 |
| 2008/0112019 A1* | 5/2008 | Kawaguchi .......... H04N 1/2032 382/312 |

(Continued)

FOREIGN PATENT DOCUMENTS

| JP | 2001-257873 | 9/2001 |
| JP | 2008-022062 | 1/2008 |

OTHER PUBLICATIONS

U.S. Appl. No. 17/986,809, filed Nov. 14, 2022.
U.S. Appl. No. 18/074,099, filed Dec. 2, 2022.

*Primary Examiner* — Chad Dickerson
(74) *Attorney, Agent, or Firm* — Venable LLP

(57) ABSTRACT

An image processing apparatus that performs processes of reducing read data in a main-scanning direction and a sub-scanning direction, wherein the image reading apparatus includes a plurality of line image sensors having a longitudinal direction as the main-scanning direction, the plurality of line image sensors are displaced in the sub-scanning direction, and the image reading apparatus relatively moves the plurality of line image sensors and an original in the sub-scanning direction, wherein the image processing apparatus comprises: a sub-scanning direction processing unit configured to perform reduction processing in the sub-scanning direction; and a main-scanning direction processing unit configured to connect data after the reduction processing is performed by the sub-scanning direction pro-
(Continued)

cessing unit in the main-scanning direction and reduces the connected data in the main-scanning direction.

13 Claims, 33 Drawing Sheets

(58) Field of Classification Search
CPC .. H04N 1/3875; H04N 1/393; H04N 1/40068; H04N 1/3878; H04N 2201/04789; H04N 2201/04791
USPC ........................................ 358/1.2, 1.11–1.18
See application file for complete search history.

(56) References Cited

U.S. PATENT DOCUMENTS

| | | | |
|---|---|---|---|
| 2009/0128854 A1* | 5/2009 | Takei | H04N 1/1912 358/1.15 |
| 2014/0192387 A1* | 7/2014 | Nomura | H04N 1/40068 358/474 |
| 2015/0055146 A1* | 2/2015 | Kurigata | G03G 15/041 358/1.1 |
| 2021/0112174 A1 | 4/2021 | Kamio et al. | H04N 1/047 |
| 2022/0070327 A1 | 3/2022 | Kamio et al. | H04N 1/00 |
| 2023/0034290 A1* | 2/2023 | Sugano | H04N 1/193 |

* cited by examiner

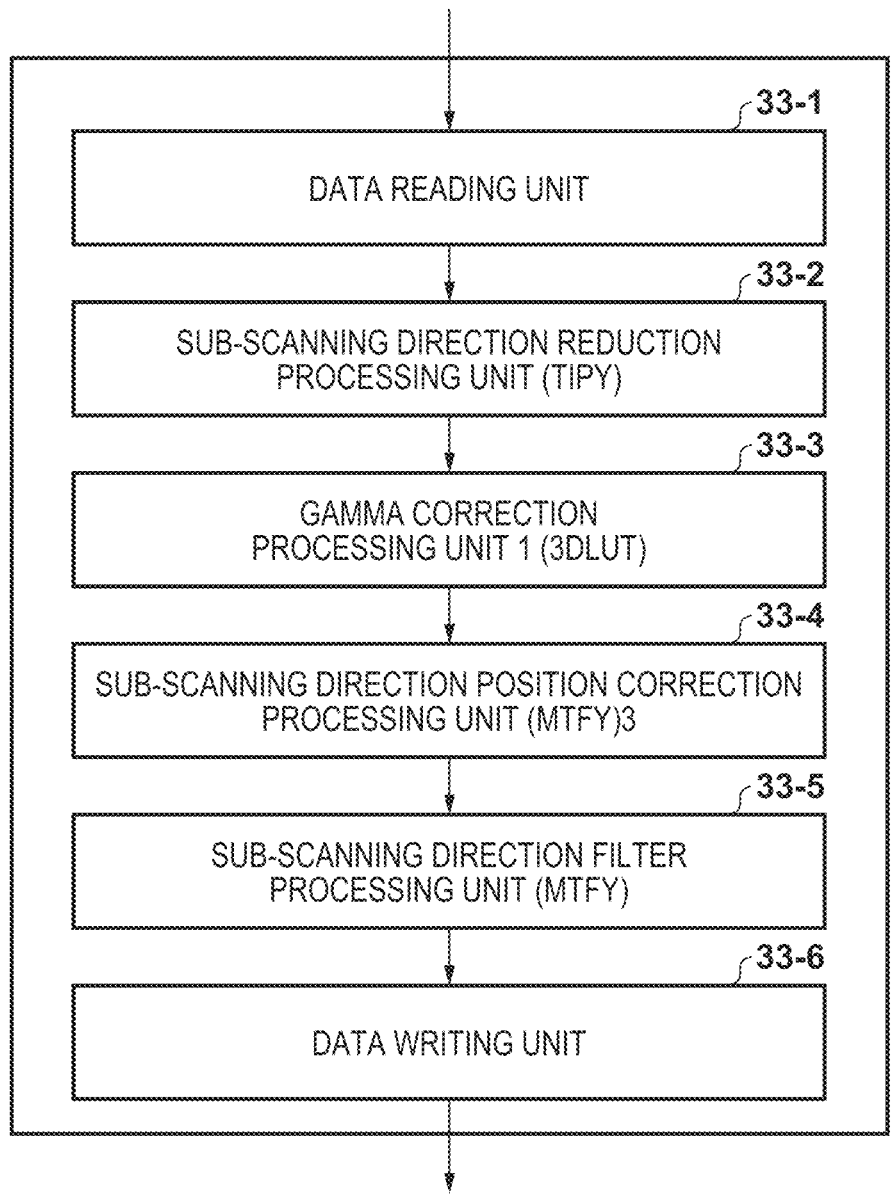

| 1 | 2 | 3 | 4 | 5 | 6 | 7 | 8 |
|---|---|---|---|---|---|---|---|
| 9 | 10 | 11 | 12 | 13 | 14 | 15 | 16 |
| 17 | 18 | 19 | 20 | 21 | 22 | 23 | 24 |
| 25 | 26 | 27 | 28 | 29 | 30 | 31 | 32 |
| 33 | 34 | 35 | 36 | 37 | 38 | 39 | 40 |
| 41 | 42 | 43 | 44 | 45 | 46 | 47 | 48 |

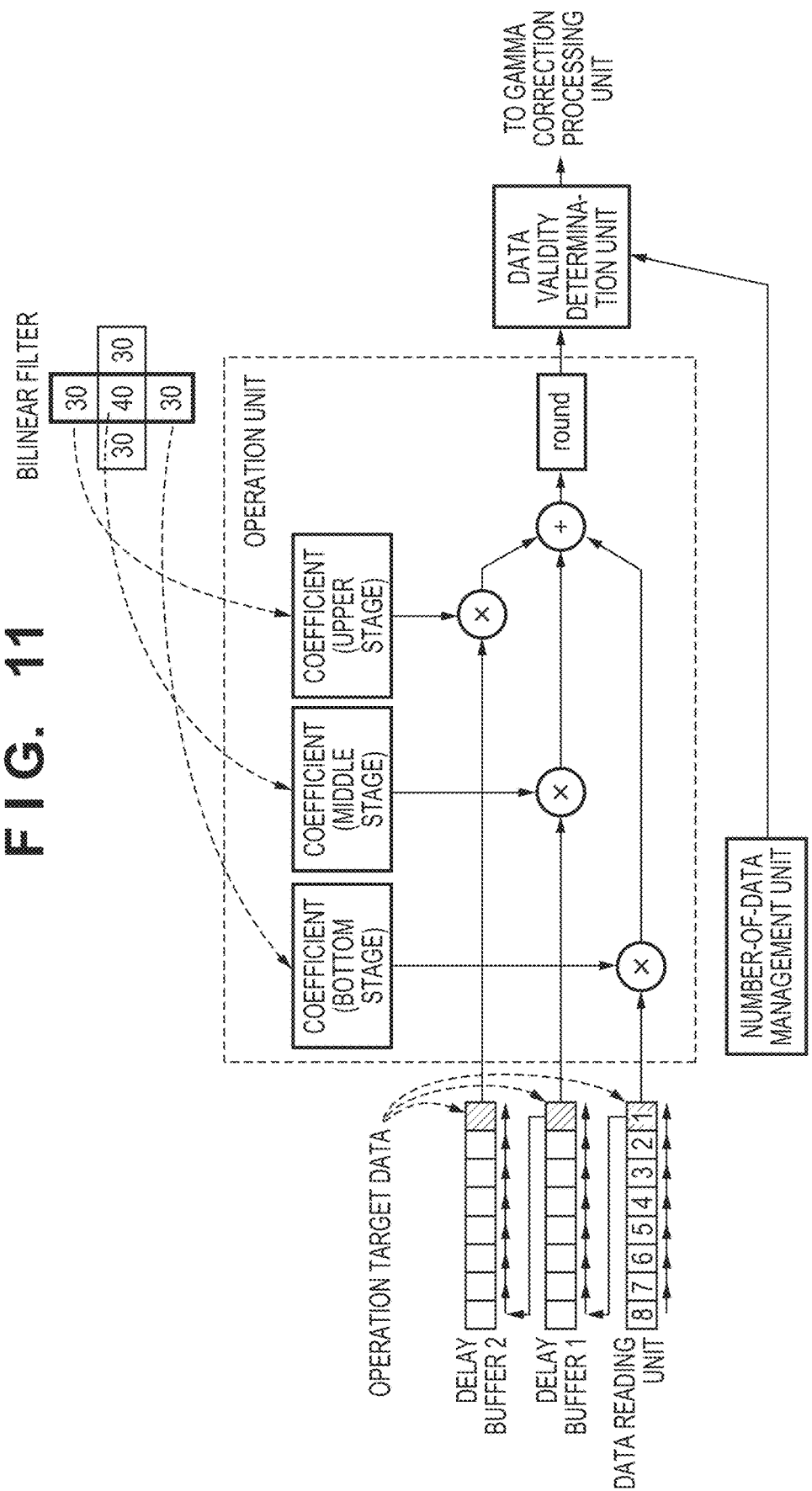

F I G. 14
| NUMBER OF FILTER COEFFICIENT MANAGEMENT DATA | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| COEFFICIENT (UPPER STAGE) | 48 | 44 | 40 | 36 | 32 | 27 | 23 | 19 | 15 | 10 | 6 | 2 | 2 | 2 | 2 | 1 | 1 | 1 | 1 | 1 | 0 | 0 | 0 | 0 |
| COEFFICIENT (MIDDLE STAGE) | 52 | 56 | 60 | 64 | 68 | 72 | 76 | 80 | 84 | 88 | 92 | 96 | 96 | 92 | 88 | 84 | 80 | 76 | 72 | 68 | 64 | 60 | 56 | 52 |
| COEFFICIENT (BOTTOM STAGE) | 0 | 0 | 0 | 0 | 0 | 1 | 1 | 1 | 1 | 2 | 2 | 2 | 2 | 6 | 10 | 15 | 19 | 23 | 27 | 32 | 36 | 40 | 44 | 48 |
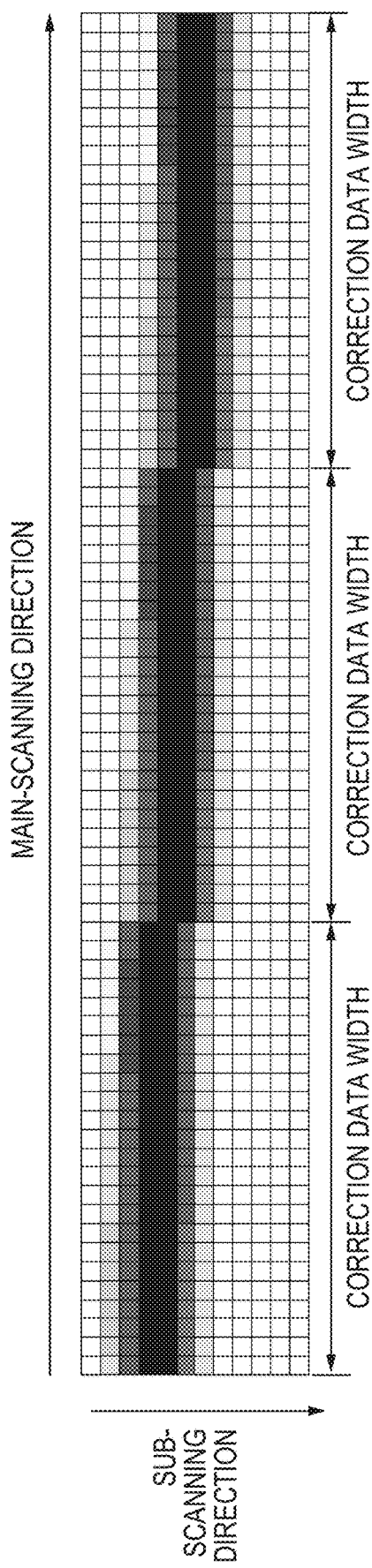
F I G. 15

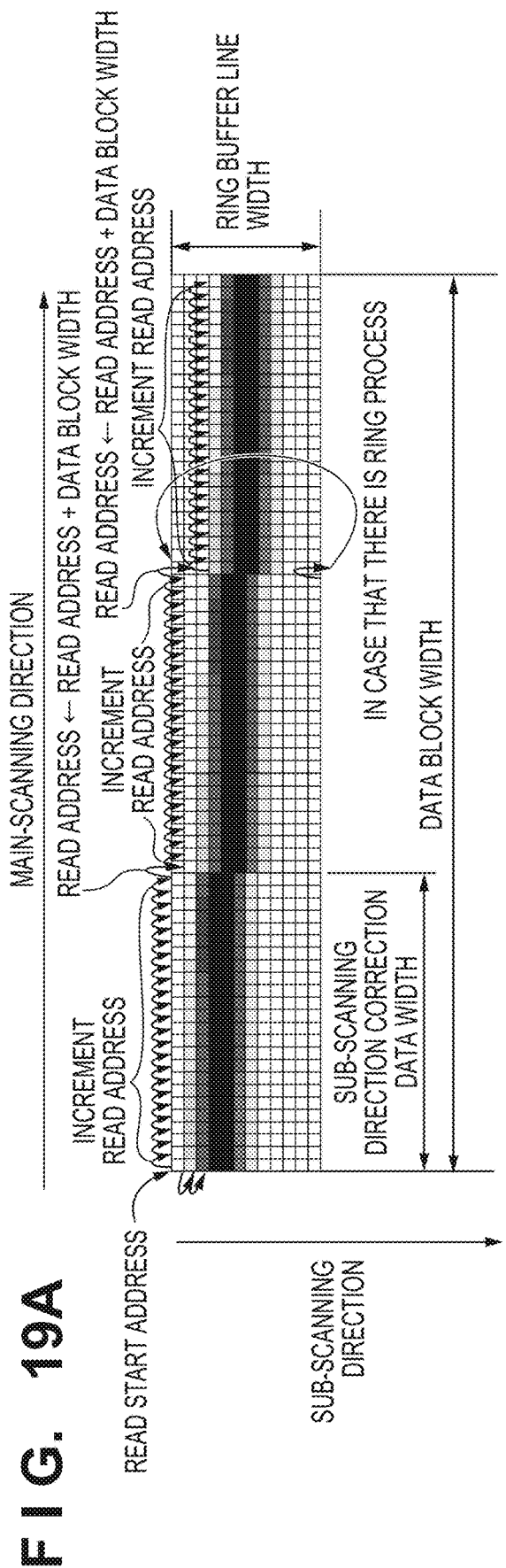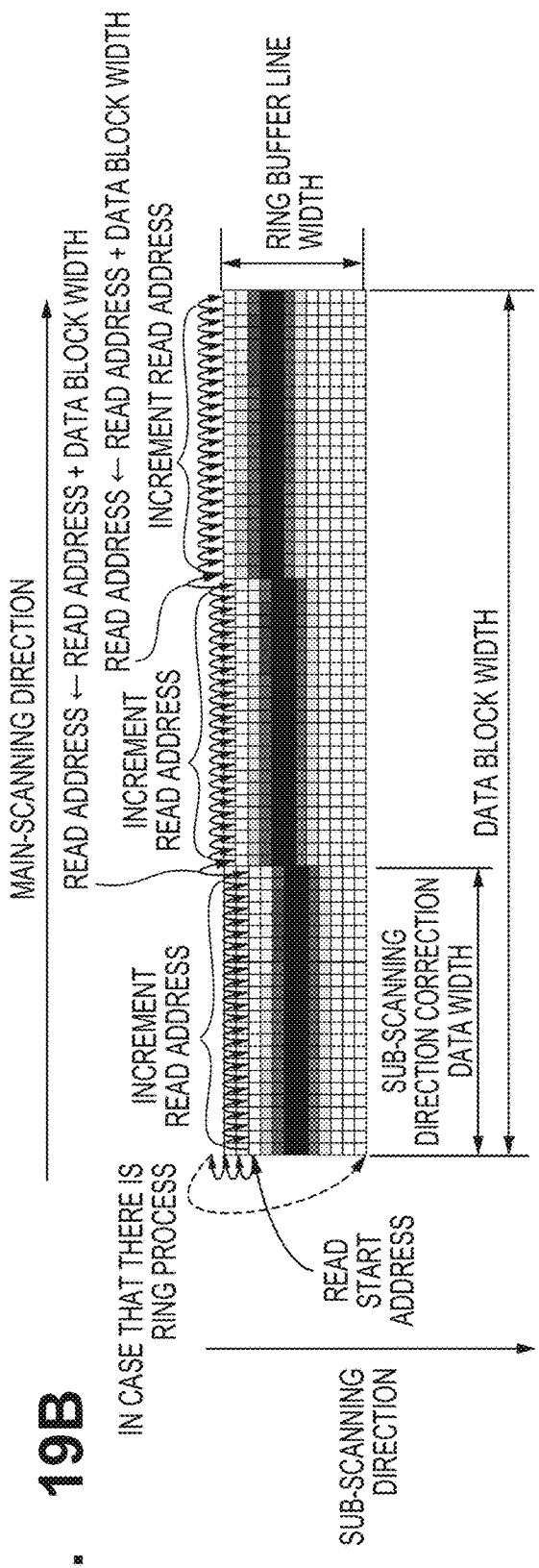

F I G. 26B

| OVERLAP DATA NUMBER | | 1 | 2 | 3 | 4 | 5 | 6 | 7 | 8 | 9 |
|---|---|---|---|---|---|---|---|---|---|---|
| CIS 11 - CIS 12 CONNECTION MASK DATA | COEFFICIENT 1 | 90 | 80 | 70 | 60 | 50 | 40 | 30 | 20 | 10 |
| | COEFFICIENT 2 | 10 | 20 | 30 | 40 | 50 | 40 | 30 | 20 | 10 |

F I G. 26C

| OVERLAP DATA NUMBER | | 1 | 2 | 3 | 4 | 5 | 6 | 7 | 8 |
|---|---|---|---|---|---|---|---|---|---|
| CIS 12 - CIS 23 CONNECTION MASK DATA | COEFFICIENT 1 | 85 | 75 | 65 | 55 | 45 | 35 | 25 | 15 |
| | COEFFICIENT 2 | 15 | 25 | 35 | 45 | 55 | 65 | 75 | 85 |

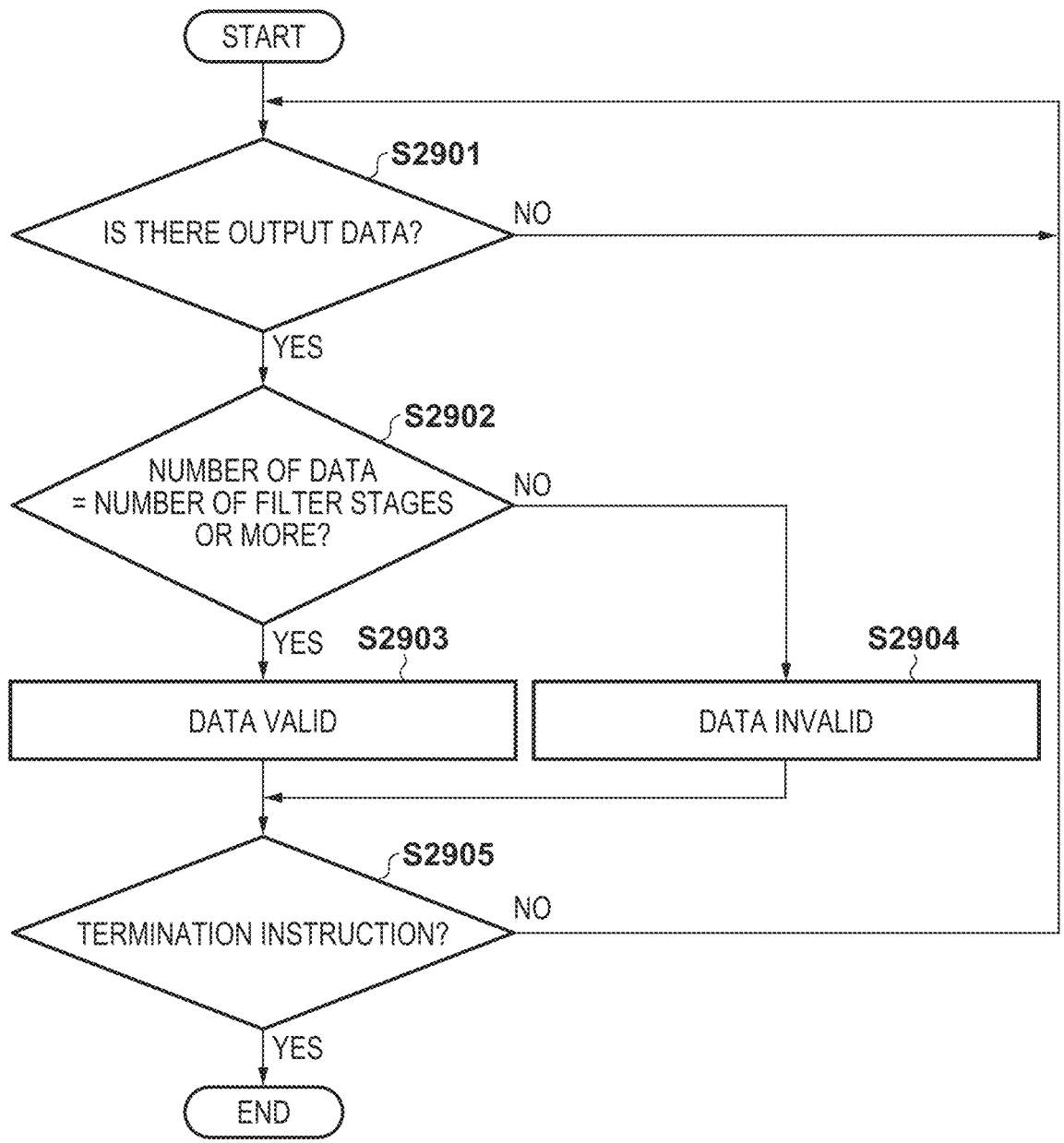

IMAGE PROCESSING APPARATUS AND CONTROL METHOD THEREOF, IMAGE READING APPARATUS, AND A NON-TRANSITORY COMPUTER-READABLE STORAGE MEDIUM COMPRISING A SUB-SCANNING DIRECTION PROCESSING UNIT CONFIGURED TO PERFORM REDUCTION PROCESSING, AND A MAIN-SCANNING DIRECTION PROCESSING UNIT TO CONNECT DATA AFTER REDUCTION PROCESSING AND REDUCES THE CONNECTED DATA

BACKGROUND OF THE INVENTION

Field of the Invention

The present invention relates to an image processing apparatus that connects data of a plurality of image sensors to generate image data.

Description of the Related Art

As means for reading images recorded in a media, such as a paper, an image sensor is generally used. Also, to read an image, for example, a long medium is read or a large amount of medium is read in some cases. Depending on a situation, there are many requests that a resolution is lower than a resolution of an image sensor for use.

In Japanese Patent Laid-Open No. 2001-257873, as an example in which a resolution is reduced from a resolution at the time of reading and an image is acquired, the following technology is proposed. Specifically, a decimation row and a row not decimated in a sub-scanning direction are determined. Nothing is performed on the decimation row, and a process of filtering, such as a bilinear method, is performed on a valid row that is not decimated using data above and below the valid row. As a result, efficiency of a process and memory usage is improved by not performing a filter process on an unnecessary decimation row.

Further, Japanese Patent Laid-Open No. 2008-22062 discloses the following apparatus as an image reading apparatus that reads images recorded in a medium, such as paper having a large size. Specifically, a plurality of image sensors are disposed in a staggered pattern, image processing means is provided for each of the plurality of installed image sensors, and finally, image data of the plurality of image sensors are connected to form large image data by one line.

As in Japanese Patent Laid-Open No. 2008-22062, in the method using the plurality of image sensors, installing the image sensors disposed in the staggered pattern to be completely parallel is difficult. Thus, for example, the image sensors are slightly inclined or the sensitivity differs slightly depending on each of the image sensors. Therefore, it is necessary to correct and connect them.

In such a case, in a case where a reduced image is attempted to be formed using means, such as Japanese Patent Laid-Open No. 2001-257873, decimation is performed for each of the plurality of sensors, and the reduced images are connected. In that case, the inclination of the sensor possibly displaces data connected between the image sensors due to the effect of inclination. In addition, there may be a case where data of a single row in the same image sensor result in not data in the same row. Therefore, the target row when the reduced image is created is changed, and a quality of the reduced image is significantly reduced.

To avoid this, after an image having a large resolution is once created, data smoothed by, for example, a bilinear filter is decimated to generate the reduced image. However, since the large image is once generated, usage of a memory is also increased, resulting in a long process step and reduction in read efficiency.

SUMMARY OF THE INVENTION

The present invention has been made in view of the above-described problems, and achieves an efficient process when a reduced image having a resolution lower than a resolution of an image read by an image reading apparatus is acquired.

According to a first aspect of the present invention, there is provided an image processing apparatus that performs processes of reducing read data from an image reading apparatus in a main-scanning direction and a sub-scanning direction orthogonal to the main-scanning direction, wherein the image reading apparatus includes a plurality of line image sensors having a longitudinal direction as the main-scanning direction disposed in the main-scanning direction, the plurality of line image sensors are displaced in the sub-scanning direction, and the image reading apparatus relatively moves the plurality of line image sensors and an original in the sub-scanning direction to read an image on the original, wherein the image processing apparatus comprises: a sub-scanning direction processing unit configured to perform reduction processing for each of the plurality of line image sensors in the sub-scanning direction; and a main-scanning direction processing unit configured to connect data after the reduction processing is performed for each of the plurality of line image sensors by the sub-scanning direction processing unit in the main-scanning direction and reduces the connected data in the main-scanning direction.

According to a second aspect of the present invention, there is provided an image reading apparatus, comprising: a reading unit configured to include a plurality of line image sensors having the longitudinal direction as the main-scanning direction in the main-scanning direction, the plurality of line image sensors being displaced in the sub-scanning direction orthogonal to the main-scanning direction, the reading unit relatively moving the plurality of line image sensors and an original in the sub-scanning direction to read an image on the original; and the image processing apparatus described above.

According to a third aspect of the present invention, there is provided an image processing method that performs processes of reducing read data from an image reading apparatus in a main-scanning direction and a sub-scanning direction orthogonal to the main-scanning direction, wherein the image reading apparatus includes a plurality of line image sensors having a longitudinal direction as the main-scanning direction disposed in the main-scanning direction, the plurality of line image sensors are displaced in the sub-scanning direction, and the image reading apparatus relatively moves the plurality of line image sensors and an original in the sub-scanning direction to read an image on the original, wherein the image processing method comprises: performing a sub-scanning direction process that performs reduction processing for each of the plurality of line image sensors in the sub-scanning direction; and performing a main-scanning direction process that connects data after the reduction processing is performed for each of the plurality of line image sensors in the sub-scanning direction process in the main-scanning direction and reduces the connected data in the main-scanning direction.

Further features of the present invention will become apparent from the following description of exemplary embodiments with reference to the attached drawings.

BRIEF DESCRIPTION OF THE DRAWINGS

FIG. 4 is a diagram illustrating a configuration of a sub-scanning direction processing unit.

FIG. 11 is a diagram illustrating a configuration of a sub-scanning direction position correction processing unit.

FIG. 14 is a diagram illustrating an example of a filter coefficient.

FIG. 15 is a diagram illustrating a result obtained by correcting the data of FIG. 9 using the filter coefficient.

FIG. 19A and FIG. 19B are diagrams illustrating a state of a memory of post-sub-scanning direction processing data when read data is inclined.

FIG. 26A to FIG. 26C are diagrams illustrating a relationship of data when CIS data is stored in a data buffer and connection data is created.

FIG. 29 is a flowchart depicting an operation of the validity determination unit of the main-scanning direction reduction processing unit.

DESCRIPTION OF THE EMBODIMENTS

Figure 1:
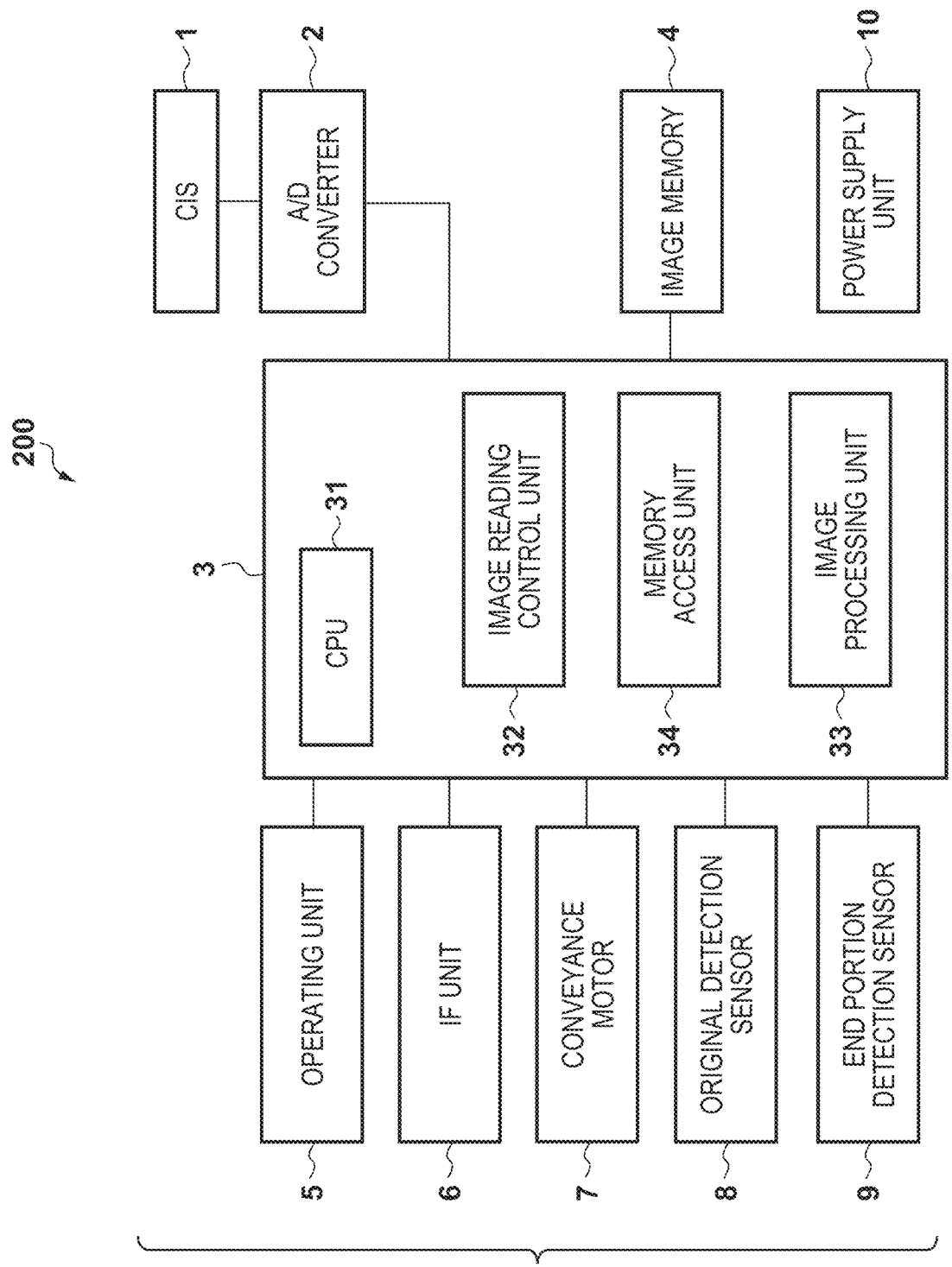
FIG. 1 is a block diagram illustrating a configuration of an image reading apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

FIG. 1 is a block diagram illustrating a configuration of an image reading apparatus as an embodiment of an image processing apparatus of the present invention.

In FIG. 1, an image reading apparatus 200 includes a system controller 3 configured by an Application Specific Integrated Circuit (ASIC), an operating unit 5, an IF unit 6, a conveyance motor 7, an original detection sensor 8, an end portion detection sensor 9, and a line image sensor 1. The line image sensor 1 is hereinafter referred to as a Contact Image Sensor (CIS). Furthermore, an A/D converter 2, an image memory 4, and a power supply unit 10 are provided. The system controller 3 includes, for example, an image reading control unit 32 that receives data from a CPU 31 and the A/D converter, an image processing unit 33 that processes read data, and a memory access unit 34 for accessing an external memory.

An original 210, which is a medium to be scanned, is conveyed by controlling the conveyance motor 7 from the CPU 31 via a motor driver. While details are described in FIG. 2A to FIG. 2C, the conveyance motor 7 rotates an upstream-side original conveyor roller 207 and a downstream-side original conveyor roller 208. The outputs from the original detection sensor 8 and the end portion detection sensor 9 are input to the CPU 31. The CPU 31 determines a drive timing of the CIS 1 based on a change in the output signals from these sensors and the state of the conveyance motor 7 and performs control. The CIS 1 outputs the read image to the A/D converter 2 as an analog signal, the signal is converted into a digital signal in the A/D converter 2, and the digital signal is input to the system controller 3.

A set process is performed on the image data converted into the digital signal in the A/D converter 2, and after that, the image data is transmitted to an external device connected by, for example, USB or LAN via the IF unit 6. The power supply unit 10 generates a voltage required for each unit to supply power.

The CPU 31 performs various operation processes, and controls the setting of the image reading apparatus 200 and start of the image reading control unit 32, the memory access unit 34, and the image processing unit 33. Additionally, operation/non-operation of each of the processing units in the image processing unit 33 can be configured, and input image data can be used as output data as is during non-operation. The memory access unit 34 reads and writes the image data from/to a region designated in advance in the image memory 4. Note that the memory access unit 34 can freely change read and write addresses in the image memory 4 by setting by the CPU 31. The image reading control unit 32 receives digital image data input from the A/D converter 2 to the system controller 3 in a line unit and outputs it to the image memory 4.

Figure 2A:
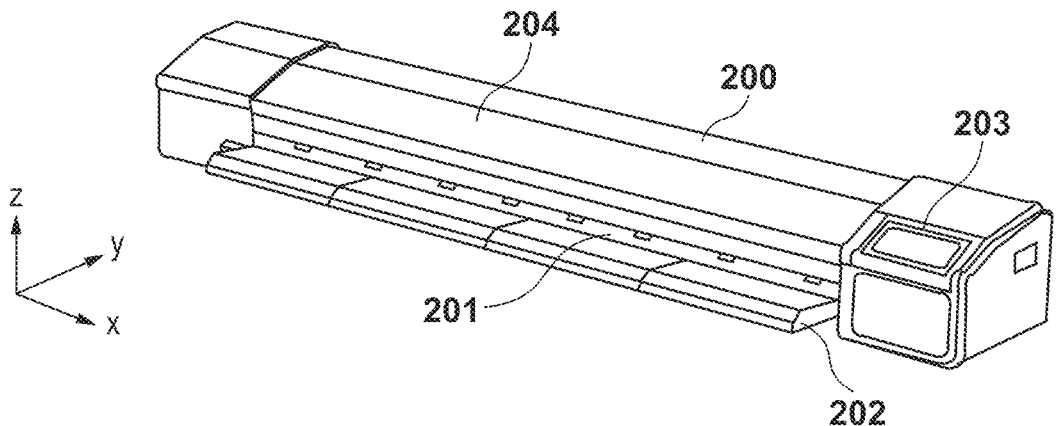
FIG. 2A to FIG. 2C are diagrams illustrating a configuration of a sheet feed type image reading apparatus.

FIG. 2A is a perspective view illustrating an appearance of the sheet feed type image reading apparatus 200. As illustrated in FIG. 2A, the image reading apparatus 200 includes an original paper feed port 201 and an original feeding base 202 on the front side of the main body. A user sets the distal end portion of the original 210 such that the center portion of the original 210 is positioned at the center of the original paper feed port 201 on the original feeding base 202 and inserts the original 210 into the original paper feed port 201 such that the original 210 slides on the base. The original paper feed port 201 is designed so as to permit, for example, positional displacement and an inclination during insertion to some extent with respect to a width in a main-scanning direction of the original readable by the image reading apparatus 200. A configuration of a feeding path of the original 210 will be described using FIG. 2B.

The image reading apparatus 200 includes the operating unit 5 including, for example, a physical key and an LCD panel on the upper surface of the main body, and it is possible to set a reading condition and input an original size with the operating unit 5. Additionally, an upper cover 204 is disposed on the upper surface of the image reading apparatus 200. Opening the upper cover 204 upward allows access to, for example, a reading unit, thus ensuring maintenance of the main body.

Figure 2B:
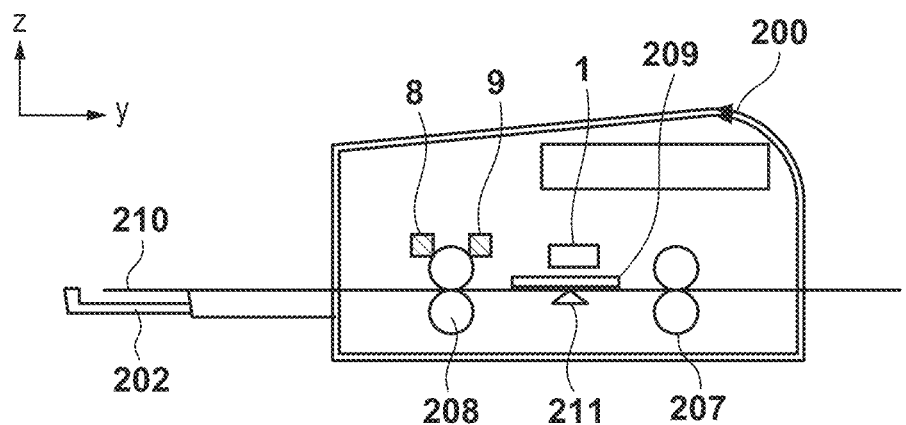

FIG. 2B is a cross-sectional view illustrating an internal configuration of the image reading apparatus 200. In the cross-sectional view of FIG. 2B, the left side is the upstream and the right side is the downstream of original conveyance, the original 210 is conveyed relative to the CIS 1 in a y-axis direction (a sub-scanning direction orthogonal to the main-scanning direction). The original 210 fed along the original feeding base 202 by a user passes through a planar conveyance path and is discharged from the back surface of the main body. The original detection sensor 8 detects the insertion of the original 210. When the original detection sensor 8 detects the insertion of the original 210, the original detection sensor 8 rotates the upstream-side original conveyor roller 208 to draw the original 210 into the conveyance path.

The end portion detection sensor 9 detects the distal end of the original 210 drawn into the conveyance path by rotation of the upstream-side original conveyor roller 208. The detection result by the end portion detection sensor 9 is used for, for example, determining the read start position of the original 210 and detecting the position of the rear end portion of the original 210. The original 210 passes between a glass sheet 209 and an original pressure plate 211 inside the conveyance path. The original pressure plate 211 works to press the original 210 against the glass sheet 209 at a predetermined pressure.

The CIS 1 is a line image sensor in which a reading surface is arranged in the main-scanning direction, which is the longitudinal direction. In the present embodiment, while details will be described using FIG. 2C, the CIS 1 includes three CISes of a CIS 11, a CIS 12, and a CIS 13 to handle a wide original. It is designed such that the reading surface of the CIS 1 faces the glass sheet 209, and a focus position of reading is located on a contact surface between the original 210 and the glass sheet 209. The downstream-side original conveyor roller 207 is configured to be driven by the upstream-side original conveyor roller 208 via a belt (not illustrated), and has a role of discharging the original 210 that has passed through a pressure region to the glass plate 209 by the original pressure plate 211 to the downstream side.

The image reading control unit 32 includes, for example, a control unit of each of the detection sensors and the conveyance motor 7 for rotating the upstream-side original conveyor roller 208 and a circuit board for controlling the CIS 1 and the operating unit 5.

Figure 2C:
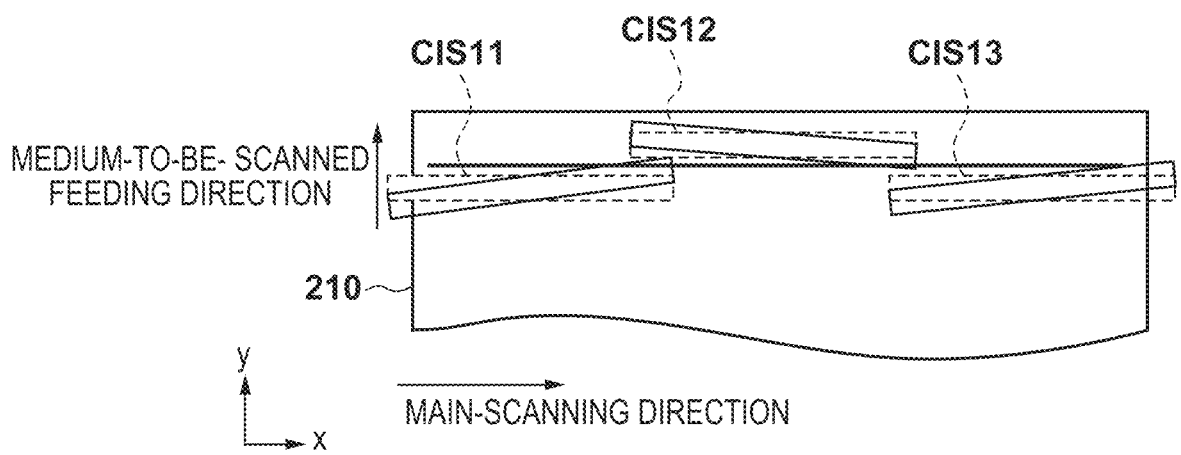

FIG. 2C is a diagram schematically illustrating a state in which the CISes 1 are disposed in a staggered pattern, and scanning is performed by moving the original 210, which is a medium to be scanned. Note that the CISes 11, 12, and 13 are ideally installed horizontally as indicated by the dotted lines, but in practice, as illustrated in FIG. 2C, the CISes 11, 12, and 13 are inclined during installation in many cases. In addition, in the present embodiment, the original 210, which is the medium to be scanned, is drawn as having a horizontal line in white background for ease of explanation. Note that, in the present embodiment, an example in which the plurality of CISes are disposed to be displaced in the staggered pattern in the sub-scanning direction is illustrated, but the state in which the CISes are disposed to be displaced in the sub-scanning direction is not limited to the staggered pattern.

Figure 3:
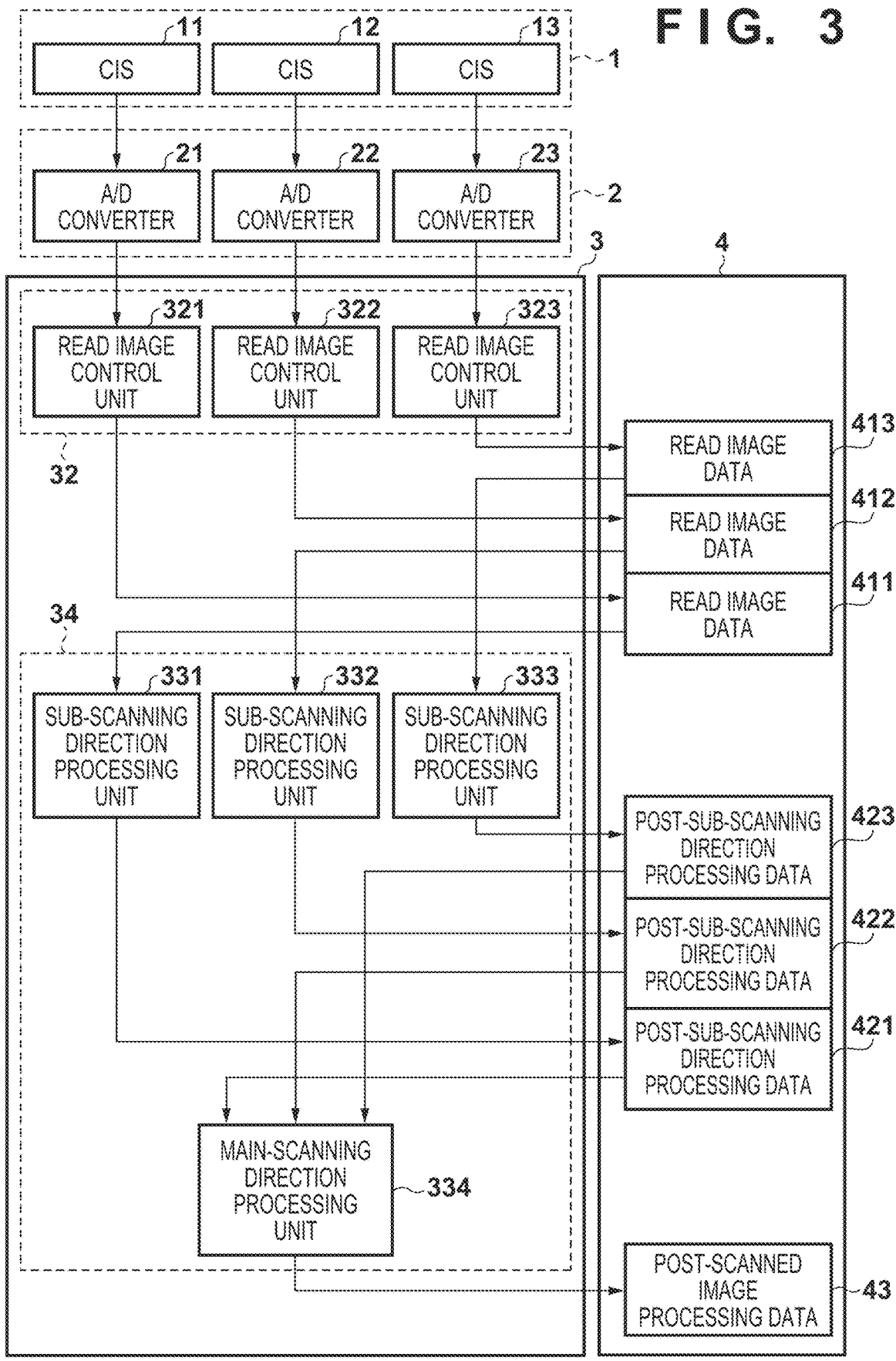
FIG. 3 is a block diagram illustrating an electrical configuration of the image reading apparatus.

FIG. 3 is a block diagram illustrating an electrical configuration of the image reading apparatus 200. Portions related to image combination in the image reading control unit 32 and the image processing unit 33 in the system controller 3 in FIG. 1, the CIS 1, the A/D converter 2, and the image memory 4 used as a work area in image processing are illustrated as a block diagram.

In the CIS 1, the three CISes having an A4 size width are disposed as the CISes 11, 12, 13, and similarly, in the AD converter 2, three A/D converters 21, 22, 23 are disposed corresponding to each of the CISes, and the signals are transmitted to the system controller 3.

The image reading control unit 32 is provided independently for each CIS such that the number of image reading control units 32 in the system controller 3 are the same as the number of CISes, and data produced by A/D conversion of the signals of the CISes 11 to 13 are stored as read data 411, 412, 413, respectively, in the image memory 4. Since a storage region for read data allows outputting of data to the image processing unit 33 while reading, the storage region often has a configuration of a ring buffer, and regarding a buffer size, a size sufficient for performing a reduction processing is ensured.

For example, a reduction processing unit and a processing unit for image combination, which are image processing portions in the image processing unit 33, are divided into a sub-scanning direction processing unit and a main-scanning direction processing unit. Sub-scanning direction processing units 331 to 333 corresponding to the number of CISes and one main-scanning direction processing unit 334 are provided.

The sub-scanning direction processing unit performs a process in the sub-scanning direction on the read image data corresponding to a respective CIS in the image memory 4, the sub-scanning direction processing unit 331 for the CIS 11, the sub-scanning direction processing unit 332 for the CIS 12, and the sub-scanning direction processing unit 333 for the CIS 13. Then, the data after process is stored in the image memory 4 as post-sub-scanning direction processing data 421, 422, 423. The post-sub-scanning direction processing data often has a ring buffer configuration, and is also of a ring buffer configuration in the present embodiment.

The main-scanning direction processing unit 334 repeats sequential reading of the post-sub-scanning direction processing data 421, 422, 423 as data in each row of the CIS, performing, for example, merging processing, and generation of image data of a long one row. Then, the image memory 4 stores the generated one image as post-scanned image processing data 43.

Note that, in the case of an RGB color image sensor, there are the same circuit configurations for the three colors. However, they have the same configuration, and therefore one color will be described in the present embodiment.

FIG. 4 is a diagram illustrating an internal configuration of the sub-scanning direction processing units 331 to 333. A data reading unit 33-1 is a block having a function of reading read image data via the memory access unit 34. The data reading unit 33-1 reads the read image data in a rectangular data unit to facilitate the subsequent image processing. The rectangular data will be described using FIG. 5A described below.

A sub-scanning direction reduction processing unit (sub-scanning direction reduction processing circuit) 33-2 performs the reduction processing on the read data only in the sub-scanning direction. Thereafter, a gamma correction processing unit 33-3 performs a three-dimensional gamma correction process on pixel data. The gamma correction processing unit 33-3 performs a correction process on the pixel data output from the sub-scanning direction reduction processing unit 33-2 and outputs it. The sub-scanning direction position correction processing unit (sub-scanning direction position correction processing circuit) 33-4 corrects the data inclined due to inclination of the CIS at the time of installation. A sub-scanning direction filter processing unit 33-5 is a portion that changes a spatial frequency to eliminate a high frequency noise during reading due to the use of the plurality of CISes. The sub-scanning direction filter processing unit 33-5 is a circuit for adjusting the high-frequency noise components due to the difference of the CISes to be the same by applying a different filter for each CIS. In this case as well, the filter operation is performed only in the sub-scanning direction.

After performing the above processes, a data writing unit 33-6 writes the post-sub-scanning direction processing data to the image memory 4 via the memory access unit 34.

Figures 5A, 5B:
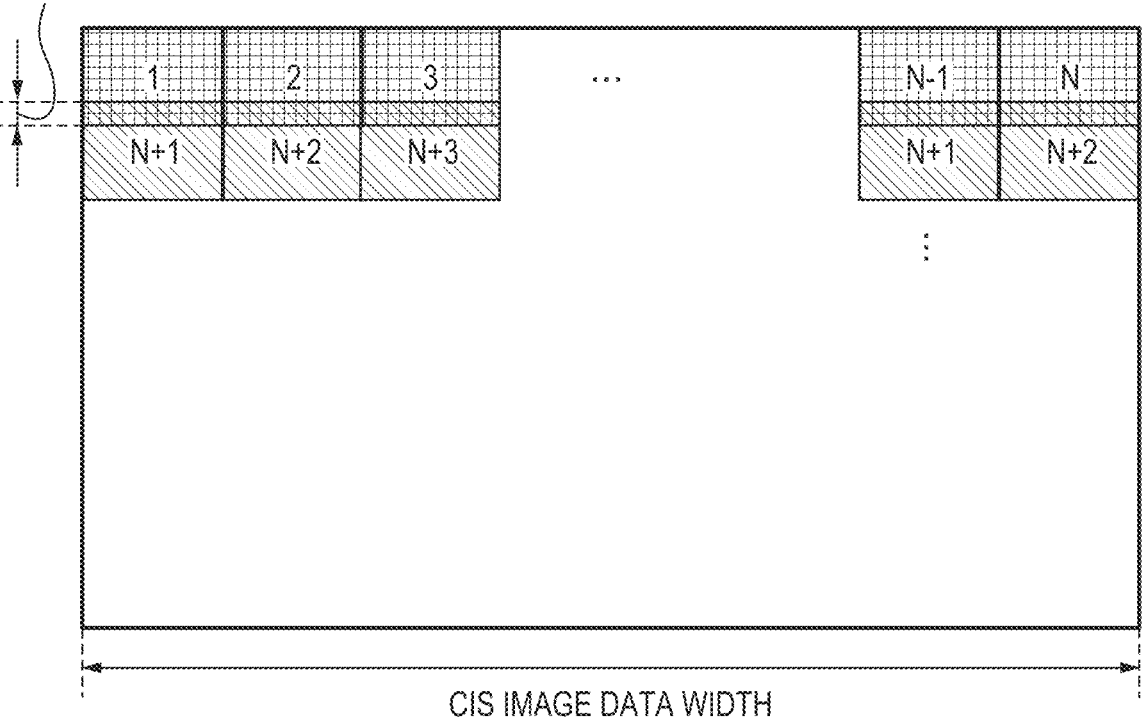
FIG. 5A and FIG. 5B are diagrams illustrating an example of reading image data with rectangular data.

FIG. 5A is a diagram illustrating an example of reading read image data in the rectangular data unit, and illustrates a case of the rectangular data unit formed by 8 pieces of data horizontally and 6 pieces of data vertically. The internal number represents the order of transmission of the read data to the next sub-scanning direction processing unit. This is an example, and the rectangular width of the horizontal data is preferably configured by a divisor of the number of reads of the CIS. The number of rows of the vertical rectangular data is preferably a multiple value of a reduction rate set by a user in advance. For example, in a case of the reduction rate being 1/2, the number of rows is multiples of 2, and in the case of 2/3, the number of rows is multiples of 3.

FIG. 5B is a diagram illustrating the order of reading the read image data in the rectangular data unit. The read image data is read in the rectangular unit from the block (lattice) at the left end to the N-th block in the order of the numbers indicated in the blocks as in FIG. 5B. After reading by the blocks corresponding to the width of the CIS, the next block (N+1) is read by displacing the data in the sub-scanning direction. Although the first read data partially overlaps with the N+1 data in the drawing, since the read process is performed in the block unit, a filter process is required for reduction in the sub-scanning direction, and data are overlappingly read. When the reduction processing in the sub-scanning direction is not performed, the overlap reading is not required.

Figure 6:
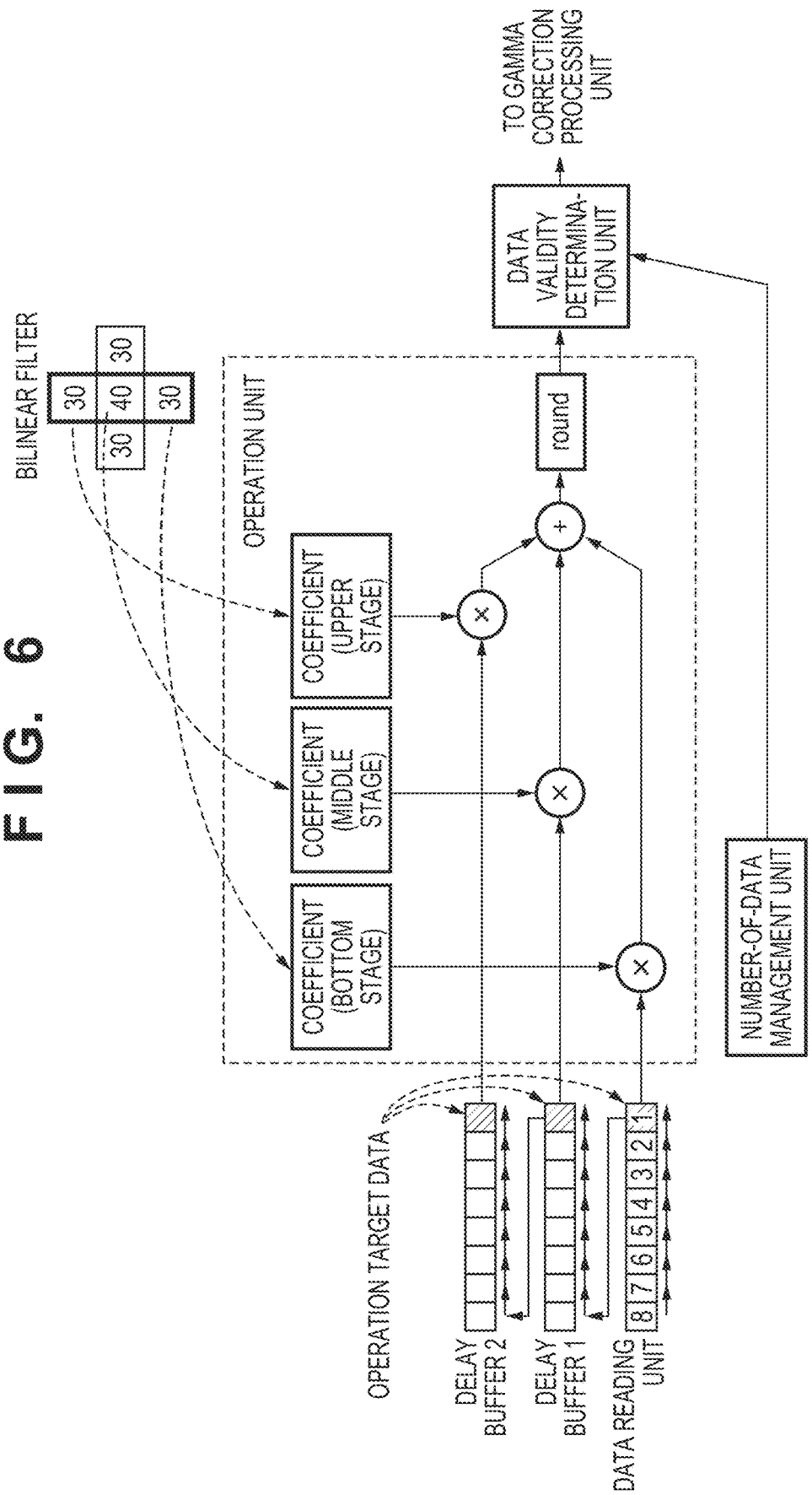
FIG. 6 is a diagram illustrating a configuration of a sub-scanning direction reduction processing unit.

FIG. 6 is a diagram illustrating the configuration of the sub-scanning direction reduction processing unit 33-2. The sub-scanning direction reduction processing unit 33-2 includes a delay buffer 1 and a delay buffer 2 for temporarily storing sub-scanning direction data and setting units of a coefficient (bottom stage), a coefficient (middle stage), and a coefficient (upper stage) where vertical coefficients of a bilinear filter used during a reduction processing operation is set. The sub-scanning direction reduction processing unit 33-2 further includes an operation unit that calculates output data using them, a number-of-data management unit that manages the number of data, and a data validity determination unit that determines whether the calculated result is valid data.

The operation performed by the operation unit is represented by Formula (1) below. Since the operation result needs to be rounded, "round" is represented in FIG. 6.

$$\text{Operation result} = (\text{read data} \times \text{coefficient(lower stage)} + \text{delay buffer1} \times \text{coefficient(middle stage)} + \text{delay buffer2} \times \text{coefficient(upper stage)}) / (\text{coefficient(lower stage)} + \text{coefficient(middle stage)} + \text{coefficient(upper stage)}) \quad \text{Formula (1)}$$

Each of the delay buffer 1 and the delay buffer 2 has a size by one row of the rectangular data to be read. When the operation process ends, the read data is shifted to the tail end of the rectangular buffer indicated by the arrow, and the data in the delay buffers are also shifted in the arrow directions. The operation target data in the delay buffer 1 is also shifted to the tail end of the delay buffer 2 at the same time, and other data is shifted in the arrow direction.

As illustrated in FIG. 6, the operation target data is the head portion of each buffer. Since the sizes of the delay buffer 1 and the delay buffer 2 are the rectangular width of the read data, the data are at the same location in the main-scanning direction and at the positions in the vertical relationship in which the sub-scanning directions are displaced by one.

Figure 7:
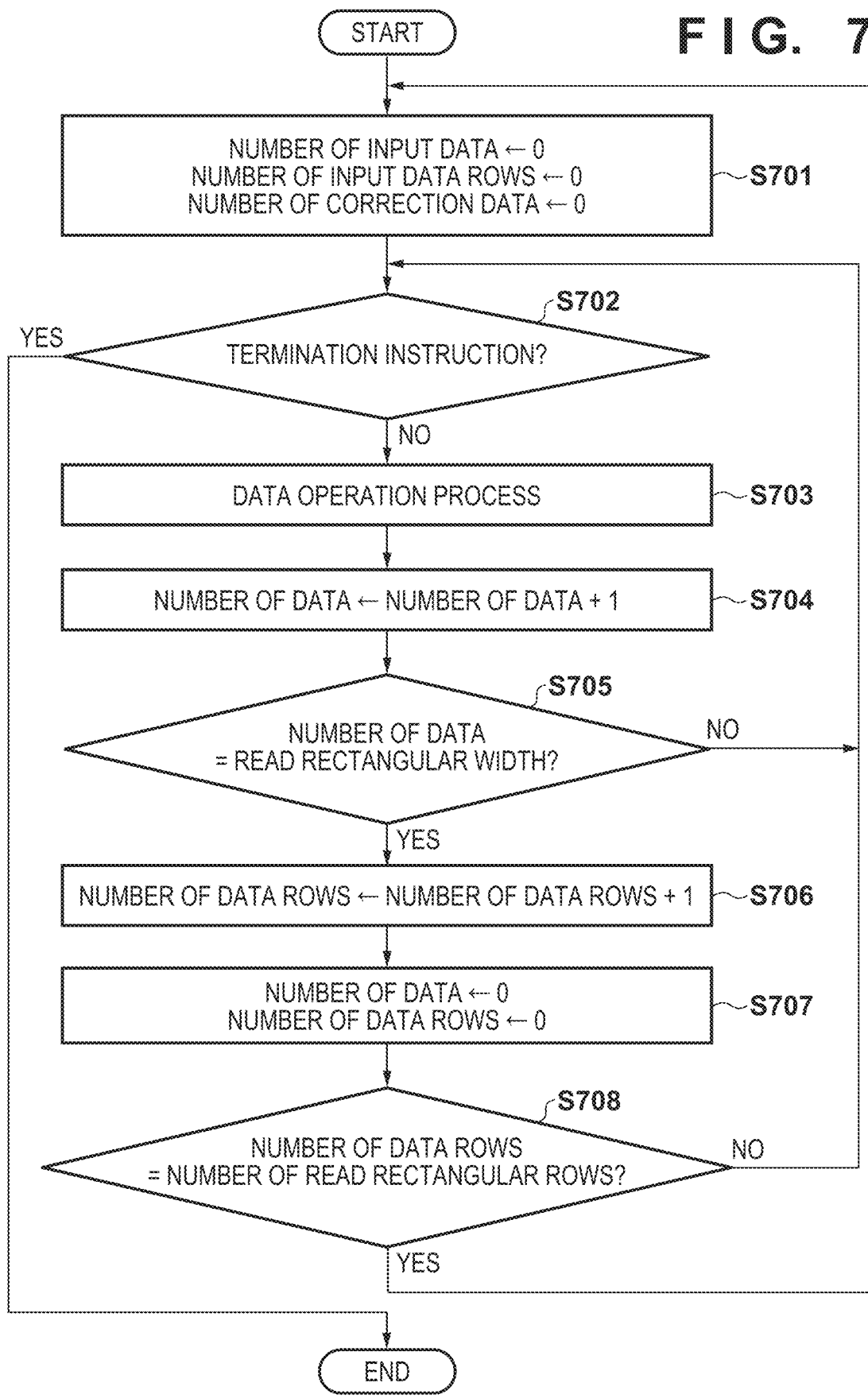
FIG. 7 is a flowchart depicting an operation of a number-of-data management unit of the sub-scanning direction reduction processing unit.

FIG. 7 is a flowchart depicting processing content of the number-of-data management unit of the sub-scanning direction reduction processing unit 33-2.

First, each of the number of input data, the number of input data rows, and the number of correction data is cleared (S701). When a termination instruction from the CPU 31 is present (S702—YES), the process is ended. In a case where there is no termination instruction from the CPU 31 (S702—NO), when the read data is input, the operation is performed using the input data and the coefficient (S703).

Thereafter, the number of input data is incremented (S704), and in a case where the number of input data does not reach a read rectangular width (S705—NO), and there is no termination instruction from the CPU 31 (S702—NO), the operation process (S703) is performed on the next data.

The processes are repeated, and when the number of input data reaches the read rectangle width (S705—YES), the number of data row count is incremented (S706), and the number of data count is cleared (S707). After that, in a case where there is no termination instruction from the CPU 31 (S702—NO), a data operation process (S703) is repeated on the input data for each row. In a case where the number of data rows reaches the number of read data rectangle rows (S708—YES), since the next rectangular data input starts, each of the number of data count, the number of data rows count, and the number of correction data count is cleared (S701), and the same process is repeated.

Figure 8:
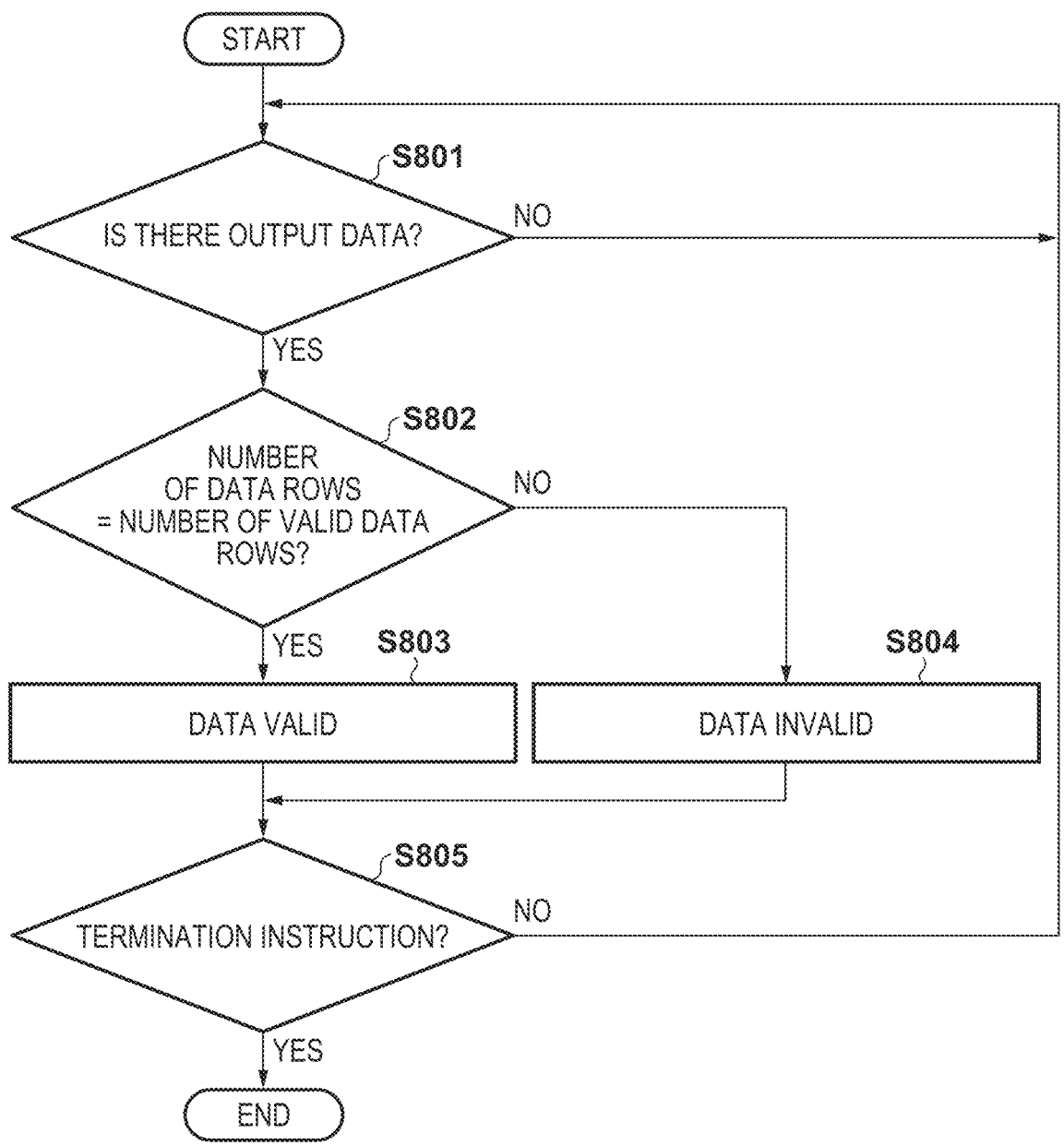
FIG. 8 is a flowchart depicting an operation of a validity determination unit of the sub-scanning direction reduction processing unit.

FIG. 8 is a flowchart depicting an operation of the data validity determination unit for output data. When the output data is present (S801), only when the value of the number of data rows count counted in the number-of-data management unit is the number of valid data rows (S802—YES), it is output as valid data (S803). Otherwise (S802—NO), it is treated as invalid data and not output (S804). The process is repeated until there is the termination instruction from the CPU 31 (S805—YES).

The number of valid data rows is, for example, the number of rows of multiples of three when the reduction rate is 1/3 times. To set 2/3 times, setting two multiples of 3-1 and multiples of 3 as valid pixels in the data validity determination unit allows changing of magnification. By using two coefficients and only one delay buffer, the reduction rate can be set to ½ times. When, for example, 1/4 times, 1/5 times, or 1/6 times is set, the hardware configuration configured such that the delay buffer can be set to have three, four, five stages, the coefficients can be set for four, five, and six stages, respectively, and allowing a configuration that allows the number of delay buffer stages and the number of coefficients to be set to any number makes it possible to handle any given reduction rate.

Figure 9:
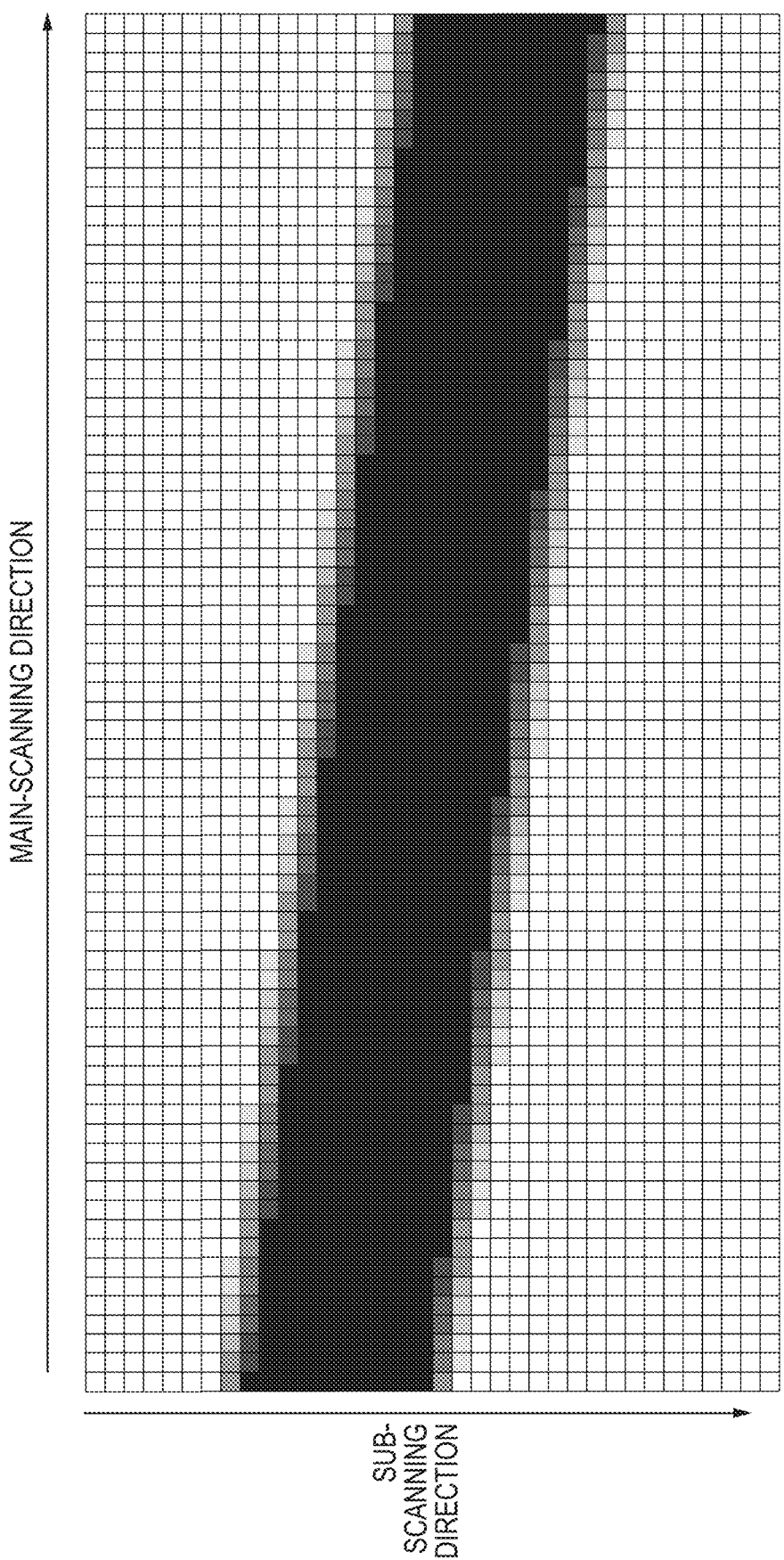
FIG. 9 is a diagram illustrating an example of read image data.
Figure 10:
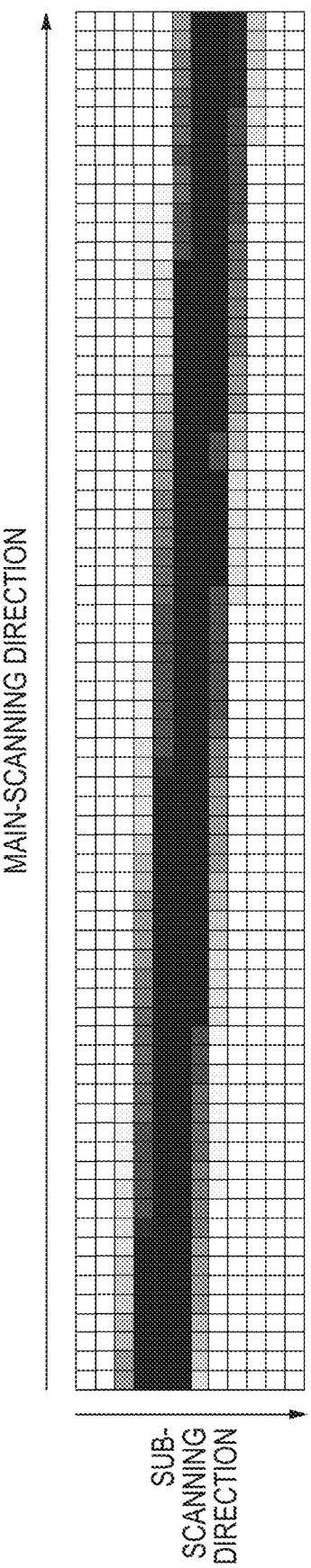
FIG. 10 is a diagram illustrating an example of a result of reduction processing (1/3 times) of the data of FIG. 9.

FIG. 9 is a diagram illustrating an example of read image data. FIG. 10 is a diagram illustrating image data of a result of performing the reduction processing (1/3 times) on the data of FIG. 9 by the sub-scanning direction reduction processing unit 33-2. In both cases, the horizontal axis represents the image data in the main-scanning direction and the vertical axis represents the image data in the sub-scanning direction in a pseudo manner. FIG. 10 is an example of a result of data reduction by the sub-scanning direction reduction processing unit 33-2.

A three-dimensional gamma correction process is performed on data after the reduction processing in the sub-scanning direction by the gamma correction processing unit 33-3. The gamma correction process corrects color data, and outputs one pixel with respect to an input of one pixel, and after that, the pixel data is output to the sub-scanning direction position correction processing unit 33-4.

FIG. 11 is a diagram illustrating a configuration of the sub-scanning direction position correction processing unit 33-4. The sub-scanning direction position correction processing unit 33-4 includes the delay buffer 1 and the delay buffer 2 for temporarily storing the sub-scanning direction data, a coefficient storage unit for performing position correction in the sub-scanning direction, the number-of-data management unit, and the data validity determination unit.

As illustrated in FIG. 2C, the CISes 11 to 13 are installed obliquely, not horizontally, in some cases. The coefficients for modifying the inclination of these individuals are stored in the coefficient storage unit, and used for position correction. Measurement is preliminarily performed at the time of, for example, factory shipment to determine the setting values of the coefficients, and the setting values are stored in the coefficient storage unit.

Each of the delay buffer 1 and the delay buffer 2 has a size of one row of the rectangular data to be read. Whenever data after the gamma process is transmitted, the operation of Formula (2) below is performed.

Operation result=(post-gamma correction process data×coefficient(lower stage)+delay buffer1×coefficient(middle stage)+delay buffer2×coefficient(upper stage))/(coefficient(lower stage)+coefficient(middle stage)+coefficient(upper stage))   Formula (2)

Figure 12A:
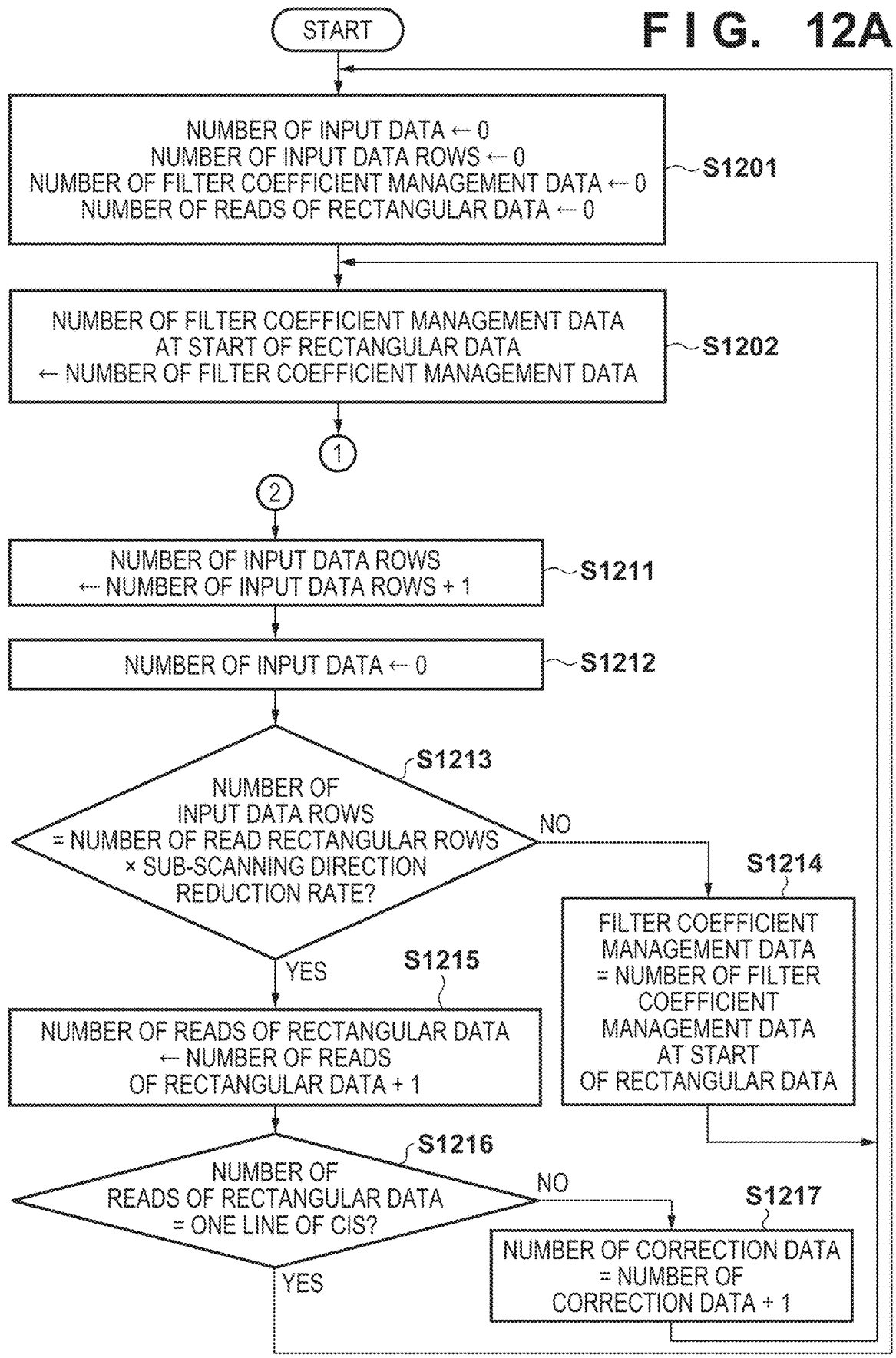
FIGS. 12A and 12B are flowcharts depicting an operation of the number-of-data management unit of the sub-scanning direction position correction processing unit.
Figure 12B:
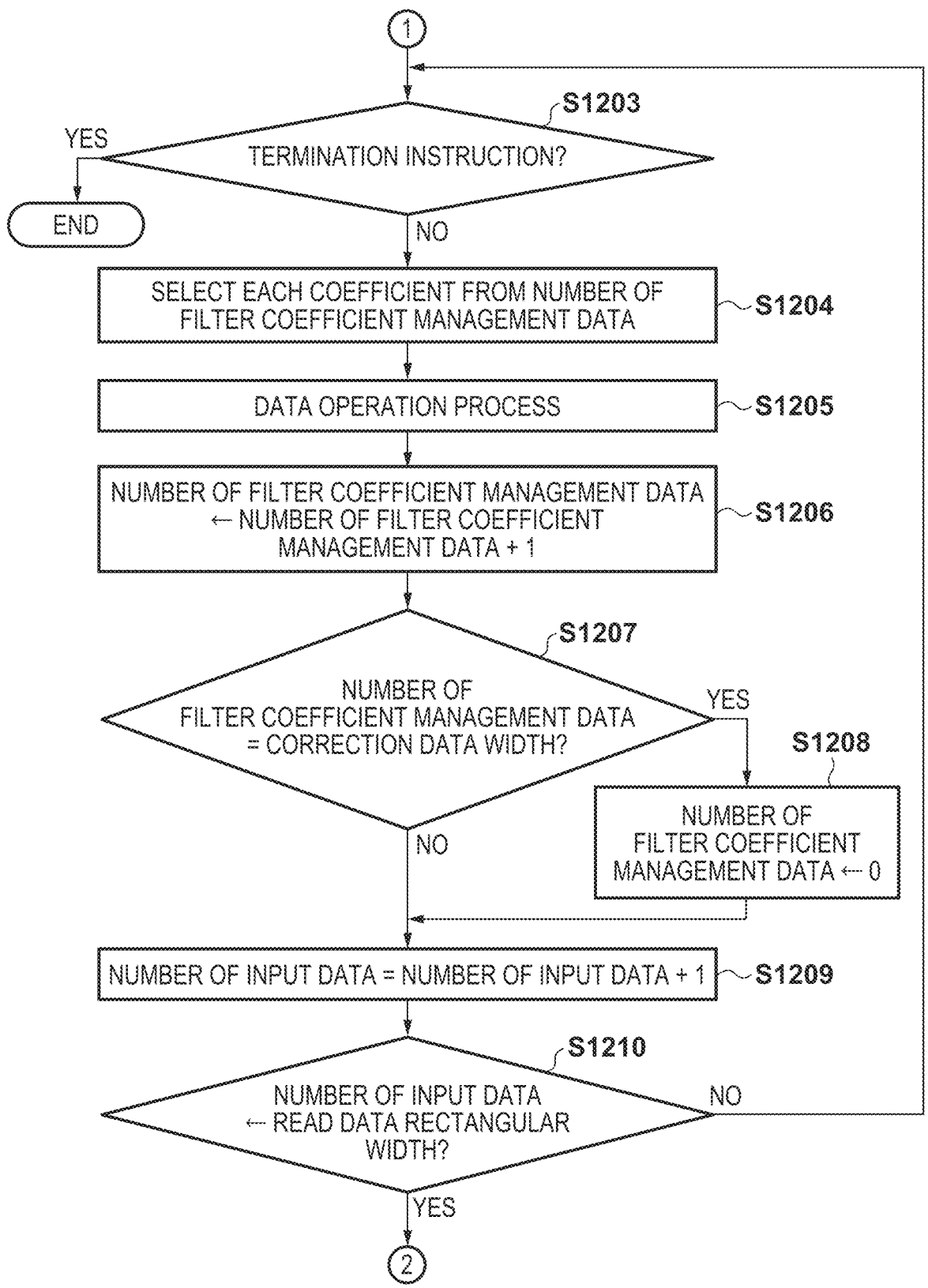

FIGS. 12A and 12B are flowcharts depicting the operation of the number-of-data management unit of the sub-scanning direction position correction processing unit 33-4.

The number-of-data management unit manages input data to select a filter coefficient. To describe the flowchart, first, the number of input data, the number of input data rows, the number of filter coefficient management data, and the number of reads of rectangular data are cleared (S1201).

Since the input data is read in rectangular data, input is the rectangular data reduced in the sub-scanning direction in the previous stage. Therefore, the number of filter coefficient management data needs to be returned to the original at the timing of increment of the number of input data rows. Therefore, here, the number of filter coefficient correction data is stored as the number of filter coefficient management data at the start of rectangular data (S1202).

When there is no termination instruction from the CPU 31 (S1203—NO), a filter is selected from the number of filter coefficient correction data (S1204), and data operation is performed (S1205). To select the filter coefficient at the time of the next data input, the number of filter coefficient correction data is incremented (S1206), and it is determined whether the number of filter coefficient correction data reaches a correction data width. When it is reached (S1207—YES), the number of filter coefficient management data is cleared (S1208). The correction data width is a width (the number of pixels) until displacement of one pixel or more occurs in the sub-scanning direction, and is measured in advance at, for example, factory shipment.

For the next input, the number of input data is also incremented (S1209), and when the number of input data does not reach the read rectangular data width (S1210—No), the operation is repeated from the operation process (S1205) on the input data. When the read rectangular data width is reached (S1210—YES), the row of the input data is changed. Thus, the number of input data rows is incremented (S1211), and the number of input data is cleared (S1212).

In a case where the number of input data rows does not reach the number of read rectangular data rows×sub-scanning direction reduction magnification (S1213—NO), the number of filter coefficient management data at the start of the stored rectangular data is set as the number of filter coefficient management data (S1214). In a case where the number of input data rows reaches the number of read rectangular data rows×sub-scanning direction reduction magnification (S1213—YES), the number of reads of rectangular data is incremented (S1215).

Then, whether the reading width of the input data is equivalent to one line of the CIS is determined. When one line of the CIS (S1216—NO) is not reached, the number of filter coefficient management data is incremented (S1217), and the new number of filter coefficient correction data is stored (S1202) as the number of filter coefficient management data at the start of the rectangular data. The subsequent operation is repeated.

When the read width of the input data reaches one line of the CIS (S1216—YES), since a process starts in the new rectangular data from the start of the CIS width, the process returns to a process of clearing the number of input data, the number of input data rows, and the number of filter coefficient management data (S1201). In both processes, when there is the termination instruction from the CPU 31 (S1203—YES), the process ends.

Figure 13:
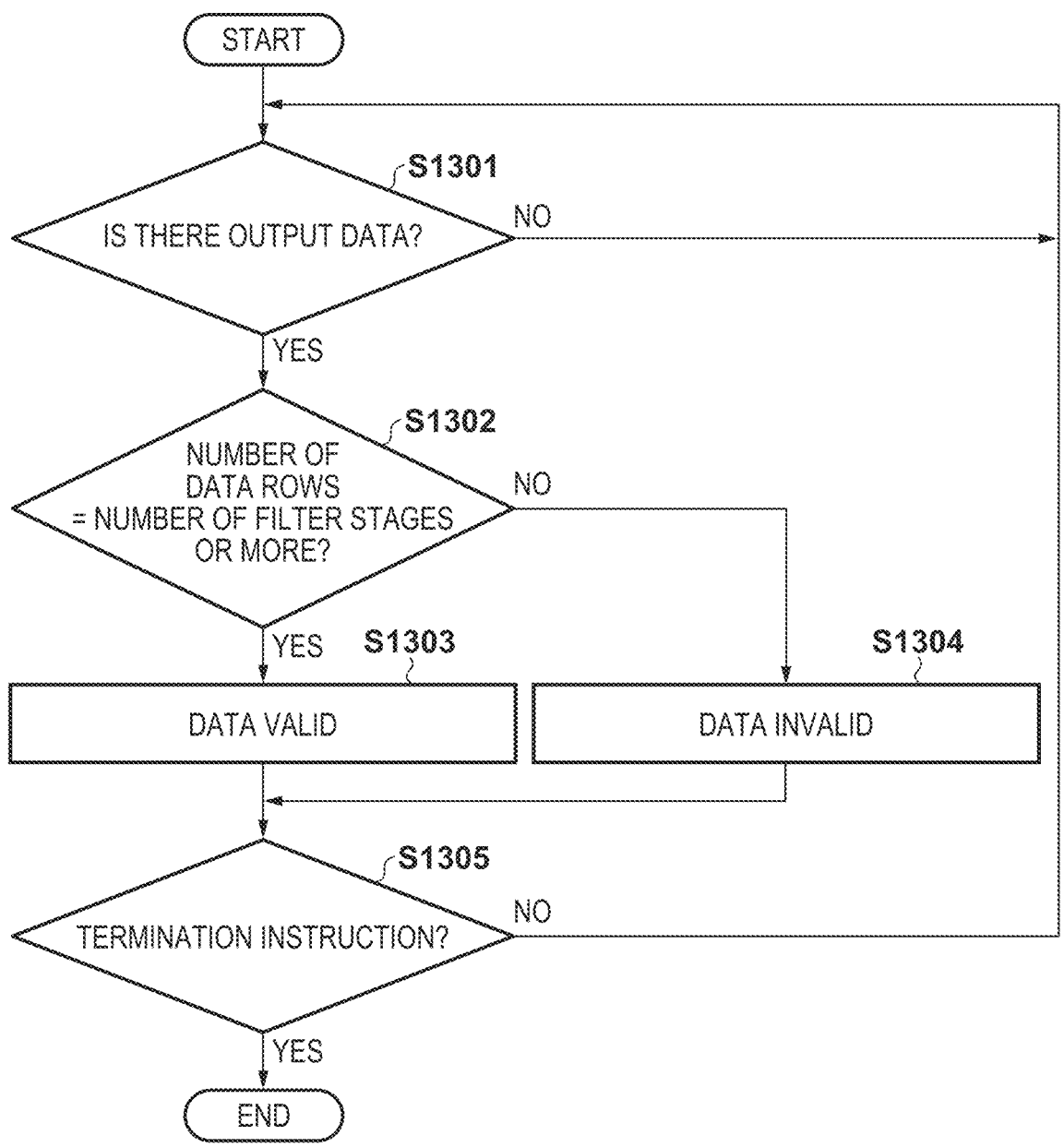
FIG. 13 is a flowchart depicting an operation of a validity determination unit of the sub-scanning direction position correction processing unit.

FIG. 13 is a flowchart depicting the operation of the data validity determination unit of the sub-scanning direction position correction processing unit 33-4.

In a case where the operated output data is present in the number-of-data management unit (S1301—YES) and the number of data rows is the number of filter stages or more (S1302—YES), it is output as the valid data (S1303). When the number of data rows is less than the number of filter stages (S1102—NO), it is treated as invalid data and not output (S1304). The process is repeated until there is the termination instruction from the CPU 31 (S1305—YES).

Note that in the data validity determination unit, valid data is generated when the number of rows of data input reaches the number of filter stages. Therefore, to read the read image data in the rectangular data, when the row changes as illustrated in FIG. 5B, it is necessary to read the overlap data by the amount of the following Formula (3).

Number of overlap data rows=(number of filter stage−1)×sub-scanning direction reduction magnification         Formula (3)

FIG. 14 is a diagram illustrating an example of a relationship between the number of filter coefficient management data and the filter coefficient of the sub-scanning direction position correction processing unit 33-4. An example of a filter such that the total value of the three-stage filters becomes 100 is shown. The correction data width is 24 pixels, and the coefficients are selected in accordance with the number of filter coefficient management data.

FIG. 15 is a diagram illustrating results obtained by correcting the data of FIG. 9 using the filter coefficients as in FIG. 14. The horizontal axis represents the image data in the main-scanning direction and the vertical axis represents the image data in the sub-scanning direction in a pseudo manner. The result is that displacement of less than one pixel is corrected, the displacement occurs by one pixel in a state where the row is different by one pixel or more, and the state is continued.

A difference in space frequency of the input data generated from the difference in the individuals of the CISes 11 to 13 in the output from the sub-scanning direction position correction processing unit 33-4 is processed by the sub-scanning direction filter processing unit that performs correction only in the sub-scanning direction. The process is performed both in the main-scanning direction and the sub-scanning direction, but the process is performed only in the sub-scanning direction here. Similarly to the reduction processing, a method of uniformization using a bilinear filter is employed.

Figure 16:
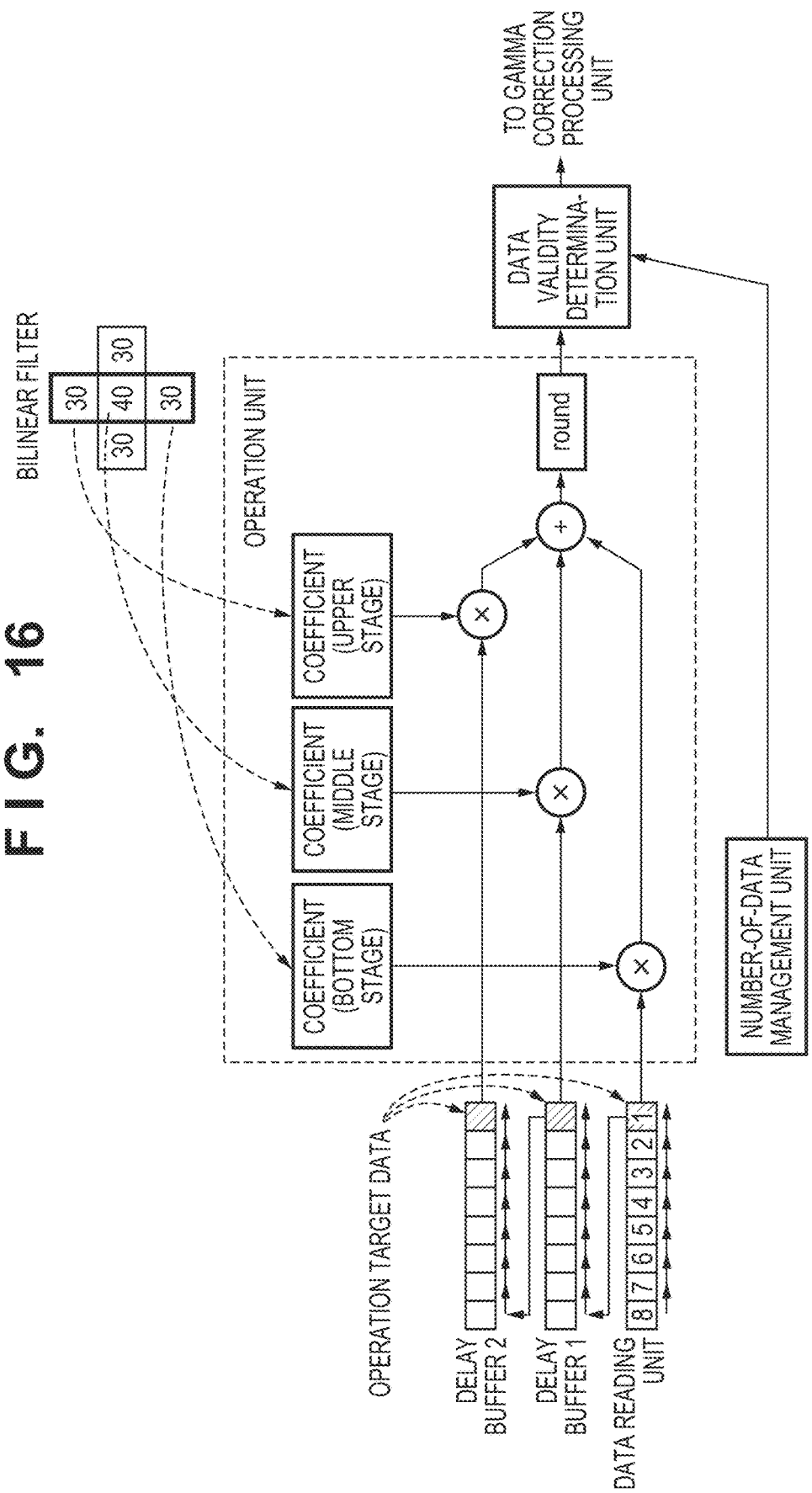
FIG. 16 is a diagram illustrating a configuration of a sub-scanning direction filter processing unit.

FIG. 16 is a block diagram illustrating a configuration of the sub-scanning direction filter processing unit 33-5. The configuration of the sub-scanning direction filter processing unit 33-5 is substantially the same as the configuration of the sub-scanning direction reduction processing unit 33-2, and the vertical coefficient of the bilinear filter is used as the filter coefficient. The difference from the sub-scanning direction reduction processing unit 33-2 is only that the result of the operation performed when the output data from the delay buffer 1, the delay buffer 2, and the sub-scanning direction processing unit are all prepared is handled as valid data in every row. Therefore, description of the detailed operation will be omitted.

In the present embodiment, the process in the sub-scanning direction position correction processing unit 33-4 and the process in the sub-scanning direction filter processing unit 33-5 are performed separately, but the processes can be performed simultaneously by superimposing the filter coefficients.

Note that when the sub-scanning direction reduction processing unit 33-2 and the sub-scanning direction filter processing unit 33-5 are configured separately without being superimposed, the filter process is performed twice. Therefore, to read the read image data in the rectangular data, it is necessary to read the overlap data by the amount of the following Formula (4).

Number of overlap data rows=((number of sub-scanning direction reduction processing filter stages−1)+(number of sub-scanning direction filter processing filter stages−1))×sub-scanning direction reduction magnification         (4)

When these processes are ended, the process in the sub-scanning direction ends, and the data writing unit writes data to the memory as the post-sub-scanning direction processing data. The results corresponding to the respective CISes of the CISes 11 to 13 are written to the image memory 4 as the post-sub-scanning direction processing data 421, 422, 423. The process of the sub-scanning direction processing unit ends. The written post-sub-scanning direction processing data 421, 422, 423 are then processed by the main-scanning direction processing unit 334.

Figure 17:
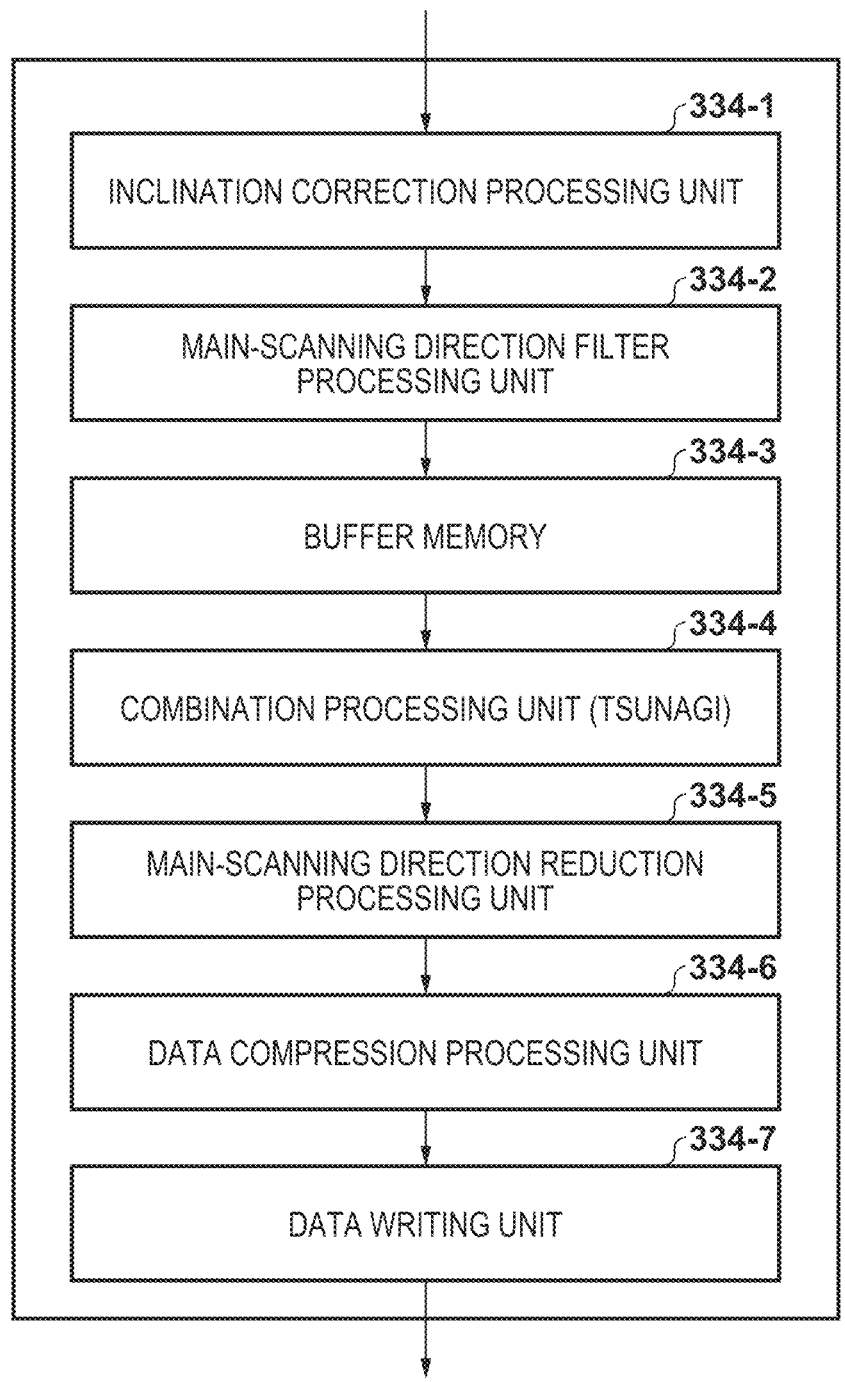
FIG. 17 is a diagram illustrating an internal configuration of a main-scanning direction processing unit.

FIG. 17 is a diagram illustrating an internal configuration of the main-scanning direction processing unit 334. The inclination correction processing unit (inclination correction processing circuit) 334-1 performs a process that changes the reading order of the data in the memory access unit on the data on which correction of less than one pixel as in FIG. 15 is performed in the sub-scanning direction processing unit to create data in the same line in the sub-scanning direction. Furthermore, the post-sub-scanning direction processing data of the CIS 11, the CIS 12, and the CIS 13 are read by one row in order.

A main-scanning direction filter processing unit 334-2 performs a process to reduce the high-frequency spatial frequency noise different depending on each CIS to be the same level on the output from an inclination correction processing unit 334-1. In the sub-scanning direction, the output from the main-scanning direction filter processing unit 334-2 is output to a buffer memory unit 334-3.

The combining process that combines data of the plurality of CISes by one row is performed on the output from the buffer memory unit 334-3 by a combining processing unit (combining processing circuit) 334-4. Thereafter, the main-scanning direction reduction processing unit (main-scanning direction reduction processing circuit) 334-5 performs the reduction processing on the combined data in the main-scanning direction. Furthermore, a data compression unit 334-6 compresses the number of data bits, and a data writing unit 334-7 writes the result to the image memory 4 as the post-scanned image processing data 43 via the memory access unit.

Figure 18A:
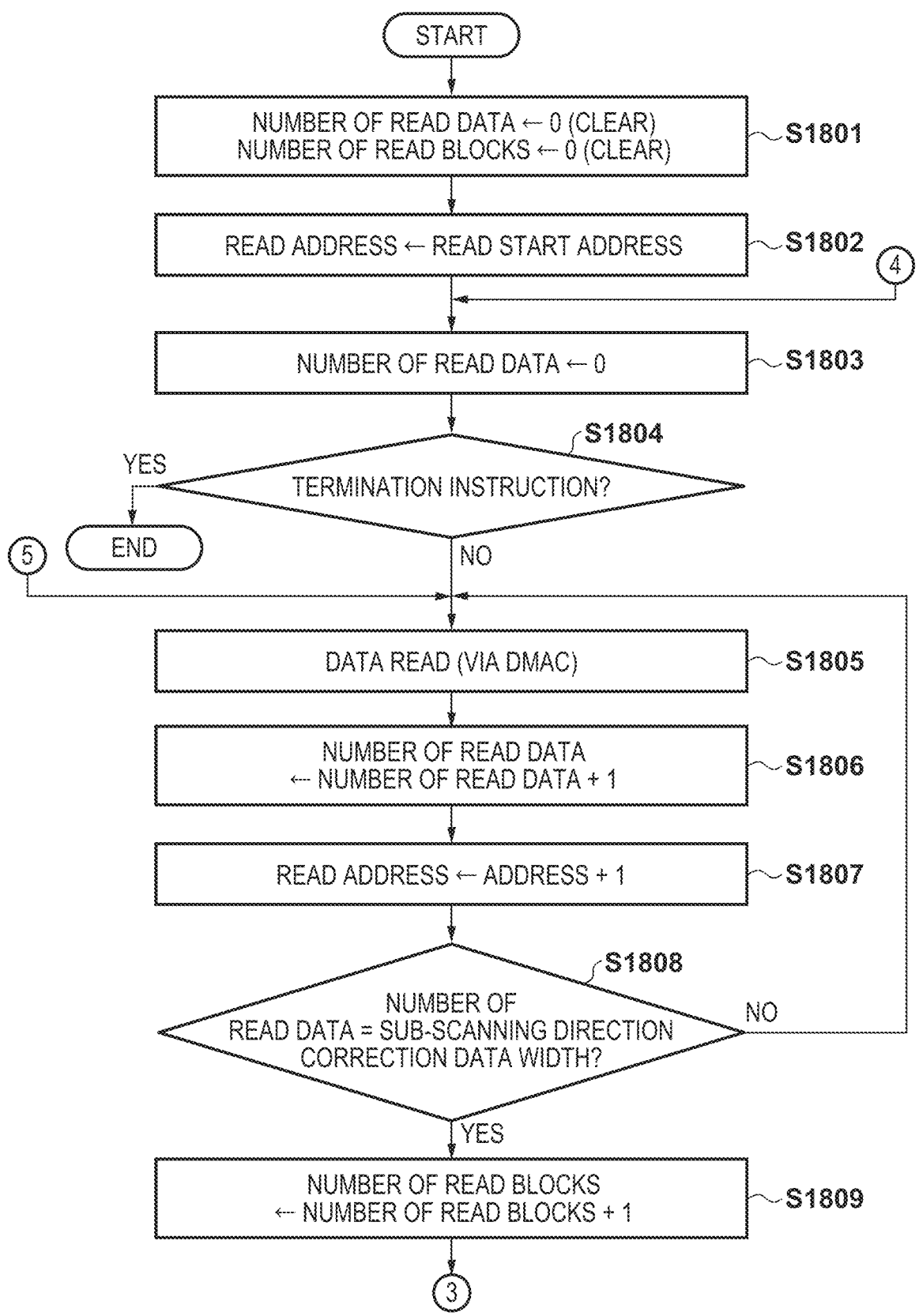
FIGS. 18A and 18B are flowcharts depicting an operation of an inclination correction processing unit.
Figure 18B:
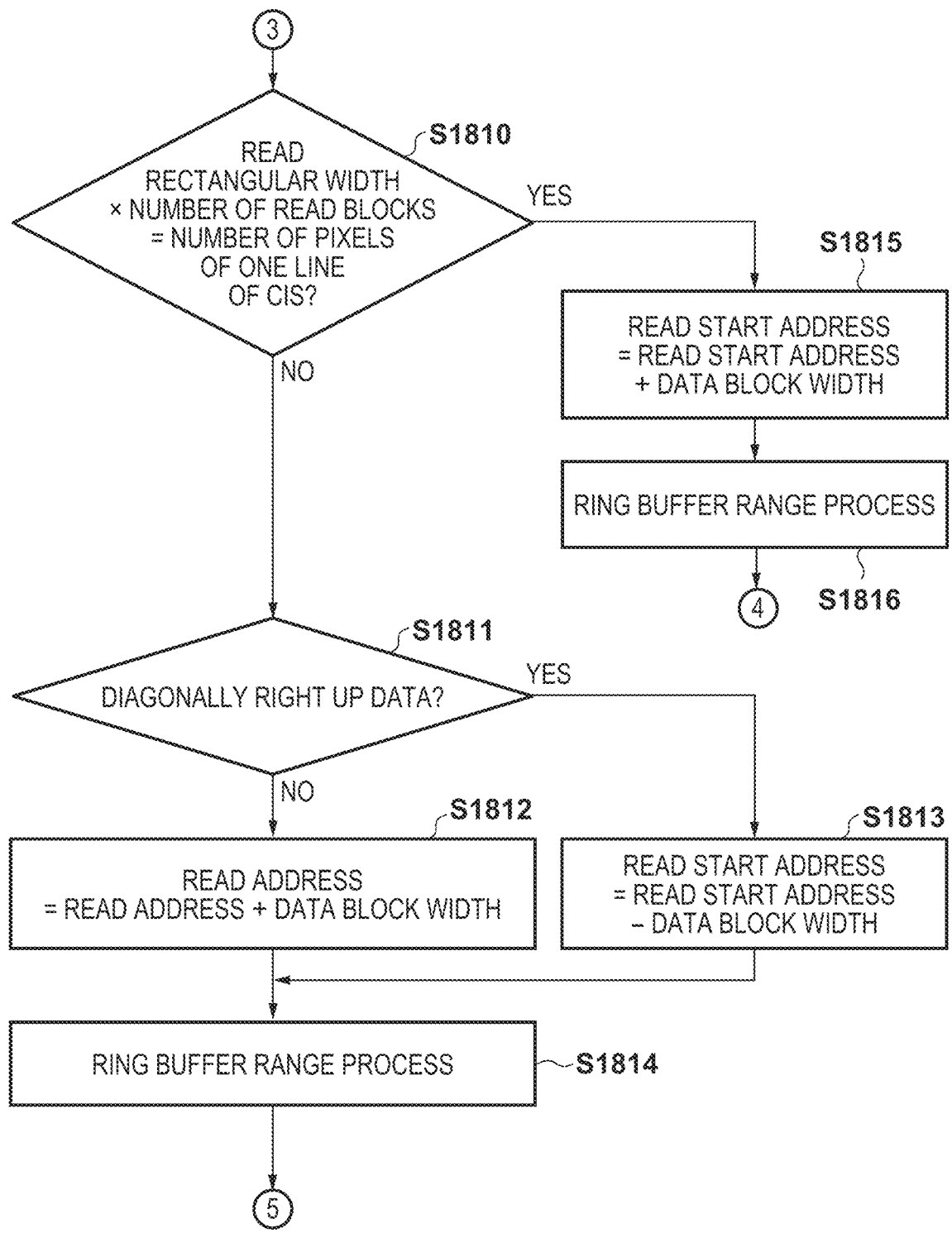

FIGS. 18A and 18B are flowcharts depicting the operation of the inclination correction processing unit 334-1.

FIG. 19A is a diagram assuming a case of reading the horizontal line by the CIS 11 and illustrating a state of the memory of the post-sub-scanning direction processing data when the read data of the horizontal line of the original becomes diagonally right down due to the inclination of the CIS.

FIG. 19B is a diagram illustrating a state of the memory of the post-sub-scanning direction processing data when the read data of the CIS is diagonally right up. In both cases, the horizontal axis represents the image data in the main-scanning direction and the vertical axis represents the image data in the sub-scanning direction in a pseudo manner. Assuming that the horizontal line is read in the CIS 11, the operation will be described based on the data.

First, the number of read data is initialized (S1801), and then a read start address is set. FIG. 19A is a diagonally right down data, and the upper-left address is designated, but in the case of the diagonally right up data of FIG. 19B, a position assuming that the address is increased is designated (S1802). The number of read data is initialized (S1803).

In a case where there is no termination instruction from the CPU 31 (S1804), data at the designated address is read (S1805). This becomes an output. The number of read data (S1806) is incremented, and, for address designation of the next read data, the address is incremented (S1807).

This is repeated until the read data becomes a sub-scanning direction correction data width (S1808—NO). When the number of read data reaches the correction width (S1808—YES), the number of read blocks is incremented (S1809).

In a case where the data width of the rectangular data at the time of reading×the number of read blocks does not reach the number of data by one line of the CIS (S1810—NO) and the data is not diagonally right up data as in FIG. 19A (S1811—NO), the process proceeds to S1812. In S1812, an address by the CIS width is added to the read address such that the read address becomes a read address below by one row on the memory.

When the number of read data does not reach the number of data by one line of the CIS (S1810—NO) and is the diagonally right up data as in FIG. 19B (S1811—YES), the process proceeds to S1813. In S1813, the address by the width of the CIS is subtracted from the read address such that the read address becomes a read address above by one row on the memory. In both of subtraction and addition, a ring buffer range process is performed such that the address becomes the head line or the last line when the range of the ring buffer is exceeded (S1814).

When the number of read data reaches the number of data by one line of the CIS (S1810—YES), the process moves to the next line, and therefore a data block width that becomes one row of the CIS is added to the read start address (S1815). When the lower end of the ring buffer is exceeded, the ring buffer process of returning it to the head address at the upper end is performed (S1816). Note that when there is the termination instruction from the CPU 31 (S1804—YES), the process ends.

Figure 20:
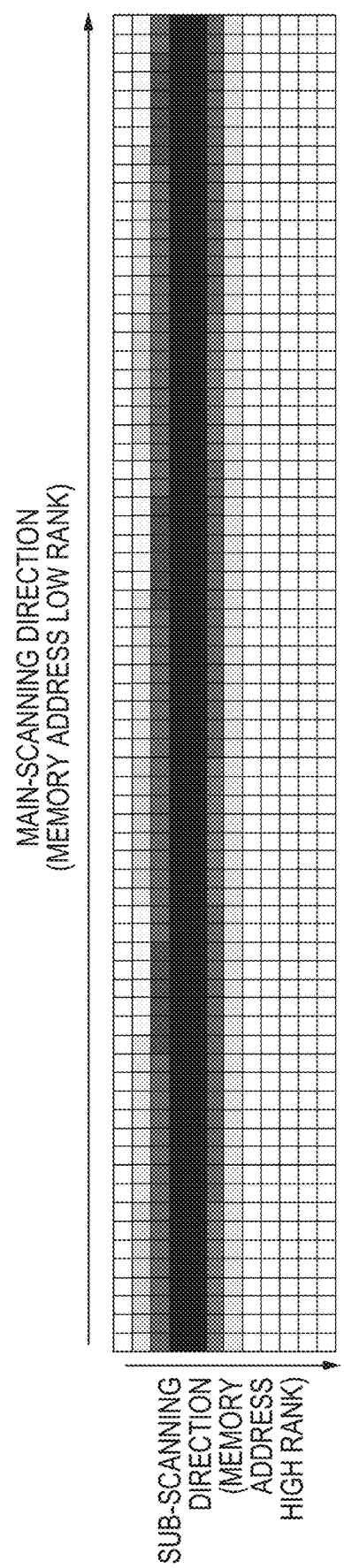
FIG. 20 is a diagram illustrating an example of data corrected by an inclination correction processing unit and read.

FIG. 20 is a diagram illustrating data when data of FIG. 19A is read by the inclination correction processing unit 334-1 for each row. The horizontal axis represents the image data in the main-scanning direction and the vertical axis represents the image data in the sub-scanning direction. The reading order is changed at a location where displacement of one pixel or more occurs in the sub-scanning direction, and thus data in the same row is corrected and read.

Figure 21:
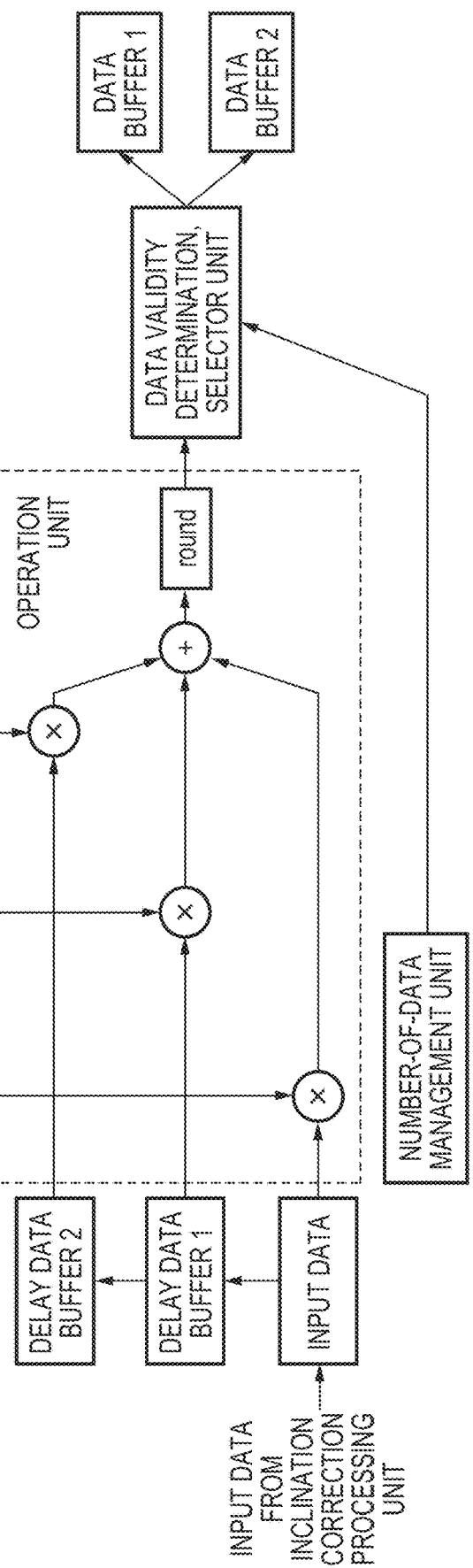
FIG. 21 is a diagram illustrating a configuration of a main-scanning direction filter processing unit.

Since high frequency noise removal different depending on each CIS is adjusted, the output from the inclination correction processing unit 334-1 is processed by the main-scanning direction filter processing unit 334-2. FIG. 21 is a diagram illustrating an overview of a main-scanning direction filter correction unit 334-2, and illustrates a configuration in which only a filter portion in the horizontal direction of the bilinear filter is calculated and output.

The main-scanning direction filter processing unit 334-2 outputs data in order for one line of the CIS to a buffer memory 334-3. Specifically, the output from the CIS 11 is output to one data buffer 1 formed by dividing the buffer memory 334-3 into two, the output from the CIS 12 is output to the data buffer 2, and the output from the CIS 13 is output to the data buffer 1.

A combination processing unit 334-4 processes the data output to the buffer memory 334-3 to perform the operation process on the overlap portions of the CISes disposed in the staggered pattern so as to cause the output data to be disposed in one line.

FIG. 21 is a diagram illustrating an overview of the main-scanning direction filter processing unit 334-2. Each of the data buffer 1 and the data buffer 2 is a data buffer for storing data read by the inclination correction processing unit 334-1 for one pixel.

The number-of-data control unit manages the numbers of data of the data buffer 1 and the data buffer 2. The operation unit performs an operation of the output data calculation during a filter process, and the operation shown by Formula (5) below is performed.

$$\text{Operation result} = ((\text{input data1} \times \text{coefficient(upper stage)}) + (\text{data delay buffer1} \times \text{coefficient(middle stage)}) + (\text{data delay buffer2} \times \text{coefficient(bottom stage)})) / (\text{coefficient(upper stage)} + \text{coefficient(middle stage)} + \text{coefficient(bottom stage)}) \quad \text{Formula (5)}$$

The data validity determination unit determines whether the operation result is valid data based on the number of data in the number-of-data management unit, and selects the data buffer of the output destination based on the data of the number-of-data management unit.

Figure 22:
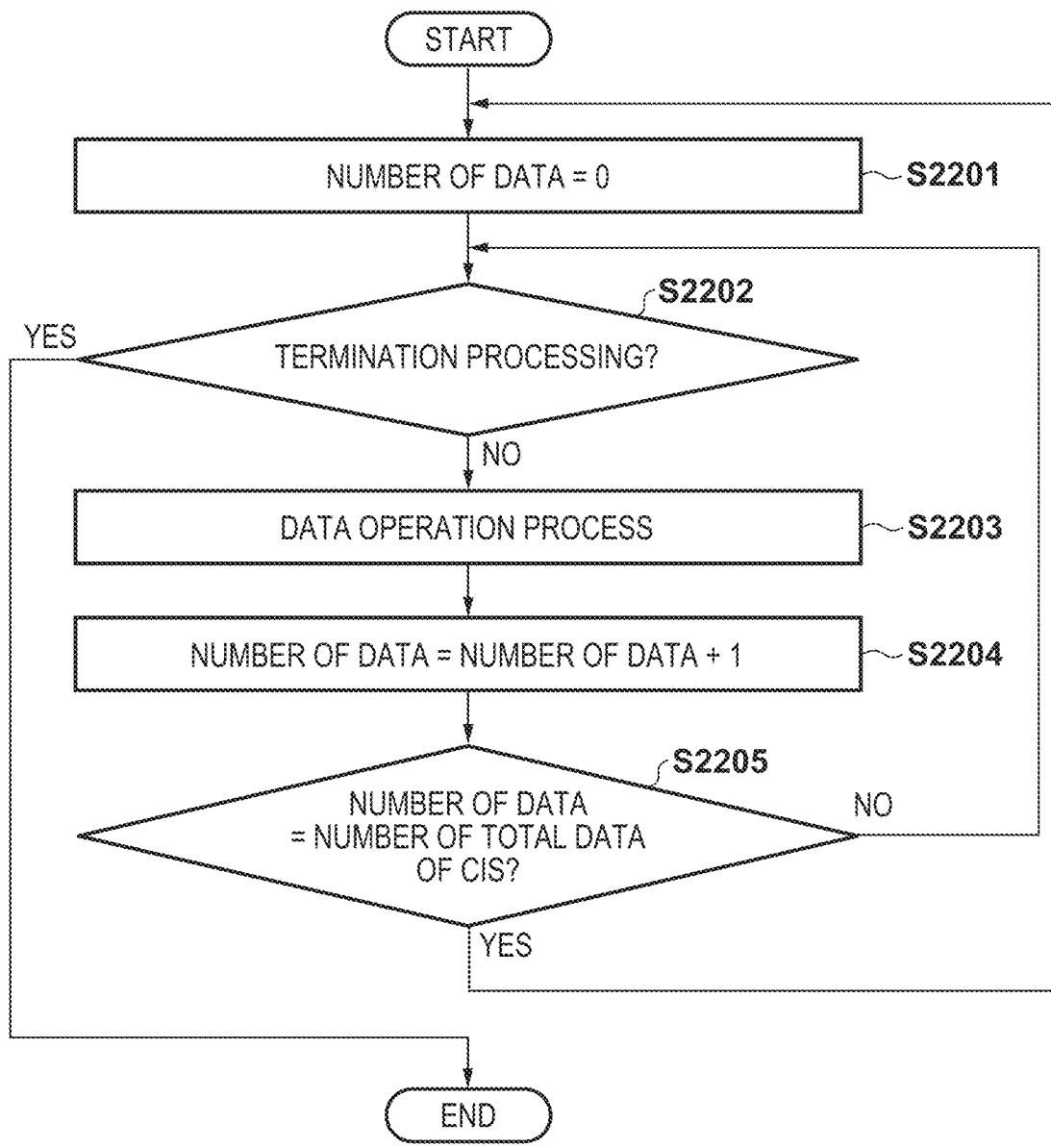
FIG. 22 is a flowchart depicting the operation of the number-of-data management unit of the main-scanning direction filter processing unit.

FIG. 22 is a flowchart depicting the operation of the number-of-data management unit of the main-scanning direction filter processing unit 334-2.

After the data is cleared (S2201) in initialization, when there is no termination instruction from the CPU 31 (S2202—NO), the number of data is incremented (S2804) after the data operation process (S2203). The process is repeated until the number of data reaches the total value of the data of one line of the CIS 11, the CIS 12, and CIS 13 (S2205—YES), and when it reaches the total value, the process returns to the beginning (S2201). When there is the termination instruction from the CPU 31 (S2202—YES), the process ends.

Figure 23:
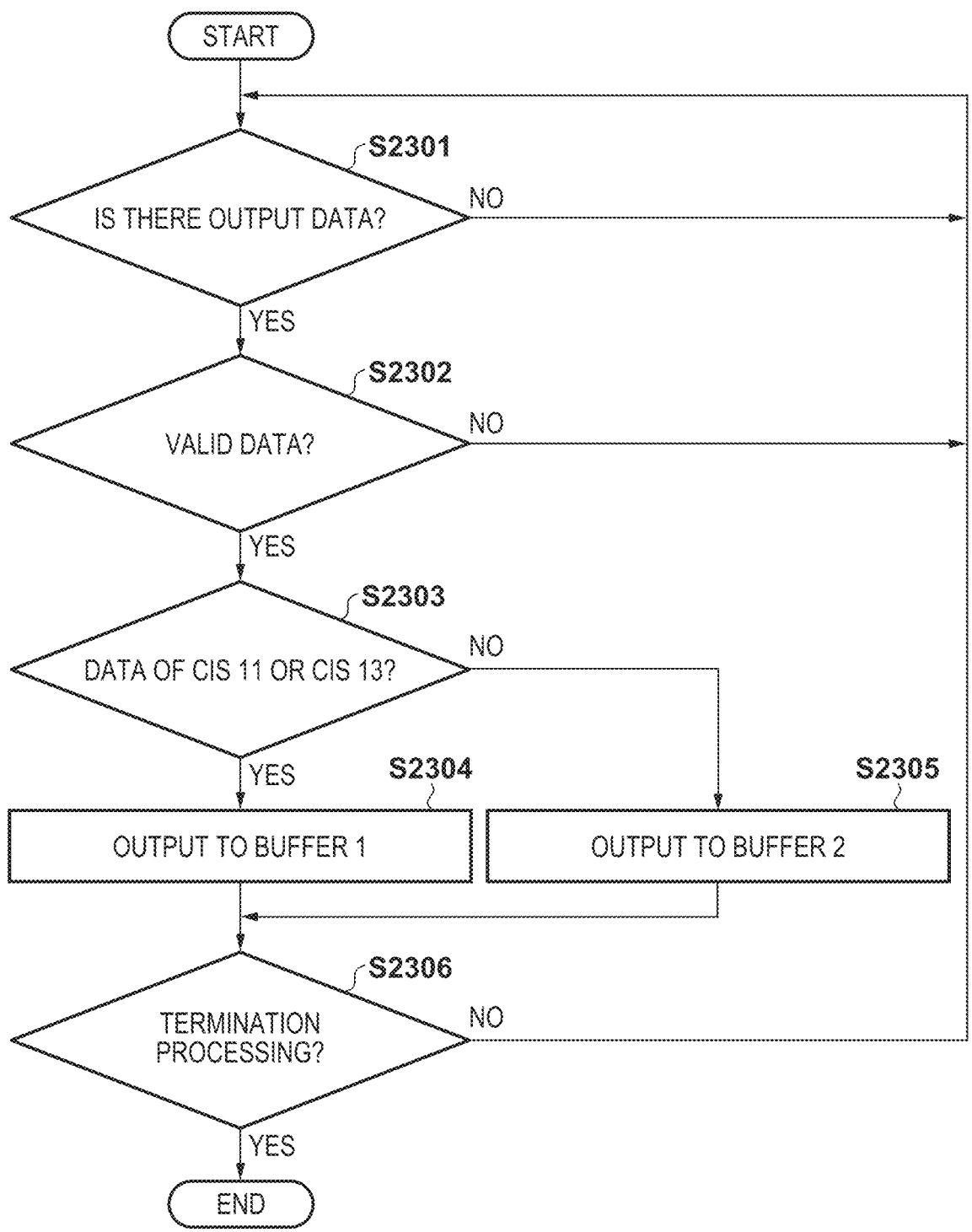
FIG. 23 is a flowchart depicting an operation of a data validity determination unit of the main-scanning direction filter processing unit.

FIG. 23 is a flowchart depicting the operation of the data validity determination unit of the main-scanning direction filter processing unit 334-2. In a case where there is output data operated based on the number of data in the number-of-data management unit (S2301—YES) and the number of data rows is the number of filter stages or more (S2302—YES), the data is valid data (S2303). When the number of data rows does not satisfy the number of filter stages (S2302—NO), it is treated as invalid data and not output (S2304). The process is repeated until the termination instruction from the CPU 31 (S2305—YES) is present, and the process ends by the termination instruction.

In the case of the valid data, the data buffer serving as the output destination of the output data is selected based on the number of data. In the case of the number of data corresponding to the CIS 11 or the CIS 13 (S2303—YES), the data is output to the data buffer 1 (S2304). In the case of the number of data corresponding to the CIS 12 (S2303—NO), the data is output to the data buffer 1 (S2305). The data buffer takes a configuration of FIFO and serves as a supply source to the next combination processing unit 334-4.

Figure 24:
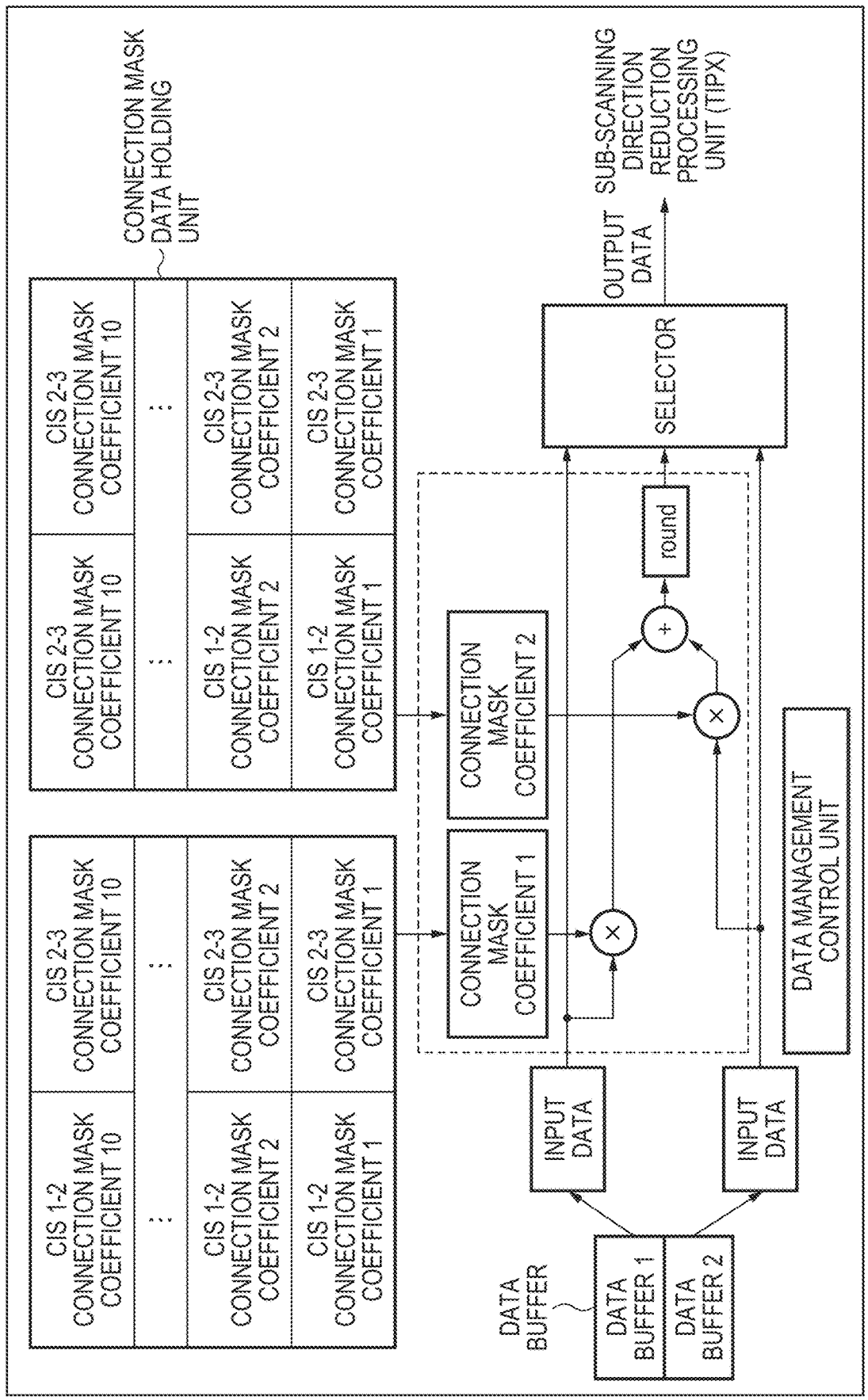
FIG. 24 is a diagram illustrating a configuration of a combining process unit.

FIG. 24 is a diagram illustrating an overview of the process of the combination processing unit 334-4. Each of the data buffer 1 and the data buffer 2 is a data buffer for storing the post-filter processing data of one line of the CIS in the main-scanning direction. A connection mask data holding unit stores coefficient data used to connect data.

The data management control unit manages the number of data in the data buffer 1 and the data buffer 2, selects connection mask data (connection mask coefficient), and selects data output. The data operation unit operates the output data when the data are connected and performs the operation shown by Formula (6) below. The connection mask coefficient varies depending on the connection location.

$$(\text{Input data1} \times \text{connection mask coefficient1}) + (\text{data from data buffer2} \times \text{connection mask coefficient2}) / (\text{connection mask coefficient1} + \text{connection mask coefficient2}) \quad \text{Formula (6)}$$

Figure 25A:
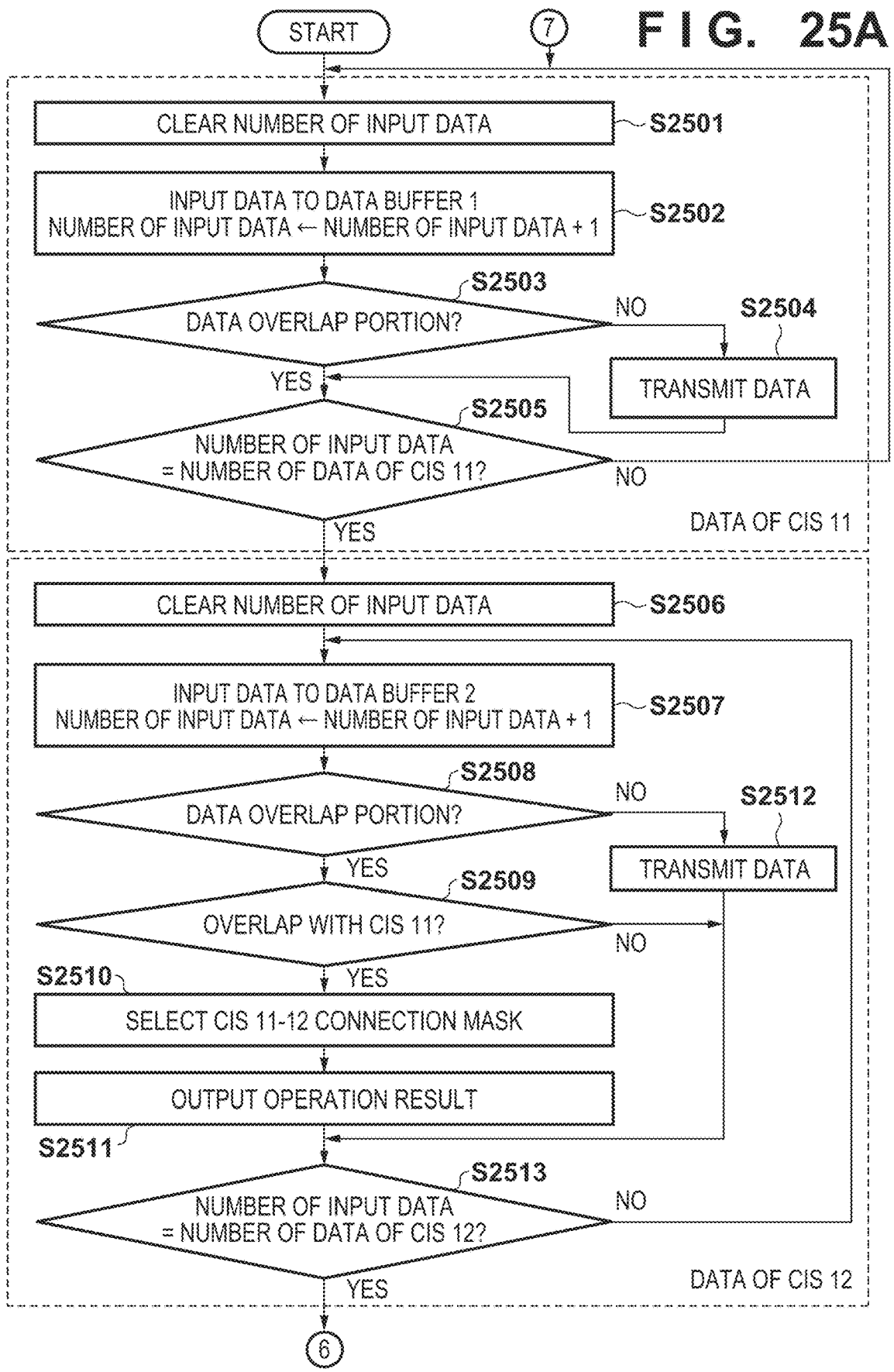
FIGS. 25A and 25B are flowcharts depicting an operation of a data management control unit.
Figure 25B:
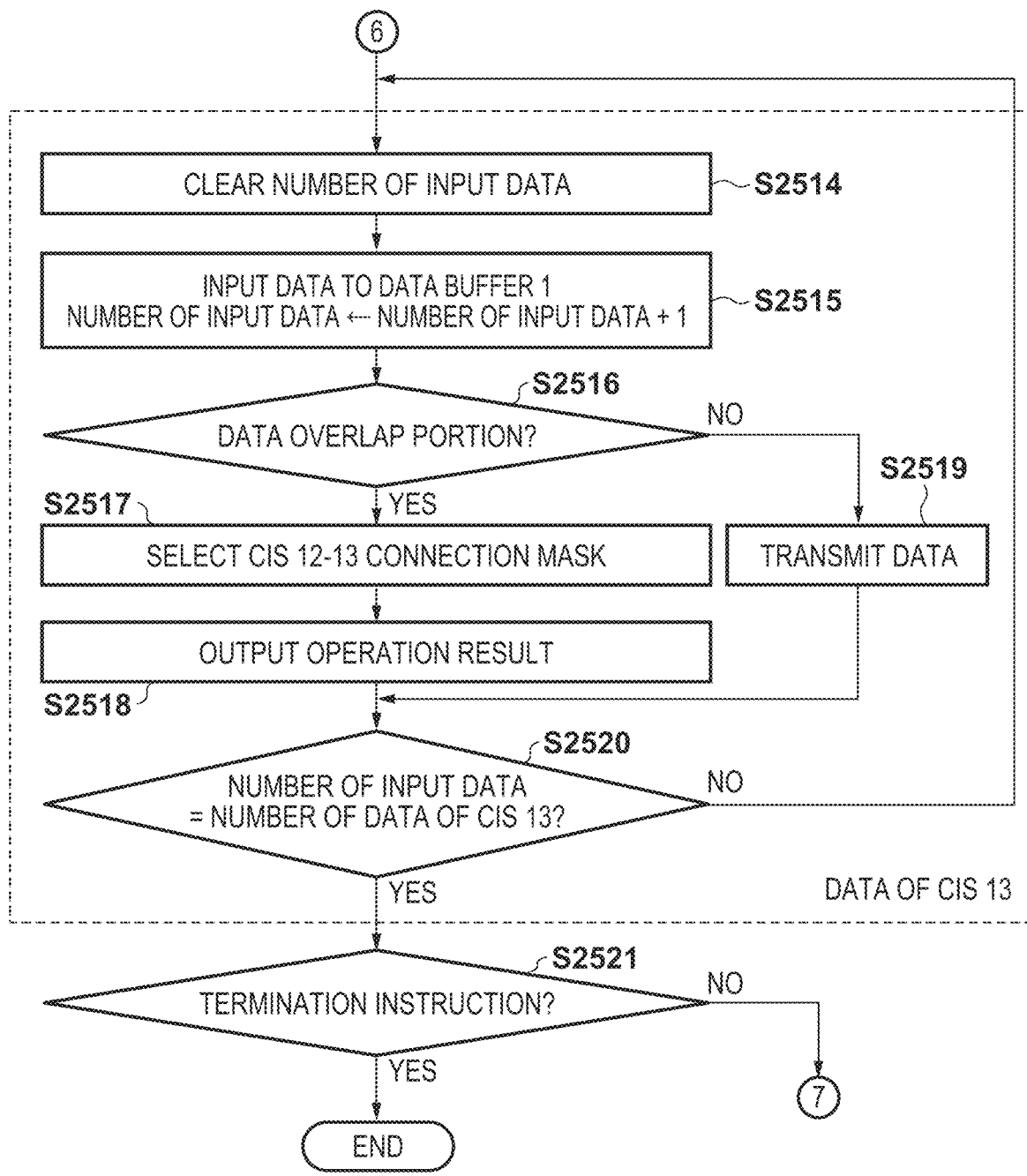

FIGS. 25A and 25B are flowcharts depicting the operation of the data management control unit.

The number of input data to the input buffer 1 is cleared (S2501). When the data is input to the input buffer 1, the number of input data is incremented (S2502), and whether the data is the data overlap portion with the CIS 12 is determined. When the data is not the data overlap portion (S2503—NO), the data is transmitted as is via a selector (S2504). When the data is the data overlap portion (S2503—YES), the data remains in the data buffer 1.

When the number of input data does not reach the number of data by one line of the CIS 11 (S2505—NO), the data of the CIS 11 is further input. Accordingly, when data is input to the input buffer 1, the process is repeated from the process of incrementing the number of input data (S2002).

When the number of input data reaches the number of data by one line of the CIS (S2505—YES), the next data of the CIS 12 is input to the data buffer 2. After the number of input data is cleared (S2506), when the data is input to the data buffer 2, the number of input data is incremented (S2507), and whether the data is the data overlap portion with the CIS 11 is determined. In a case where the data is the data of the overlap portion (S2508—YES) and the overlap portion with the CIS 11 (S2509—YES), mask data corresponding to the number of input data is selected (S2510). Then, the operation result of the data remaining in the data buffer 1 is handled as the output data (S2511). In a case where the data is overlap data with the CIS 13 (S2509—NO), the following data is input while the data remains in the data buffer 2. When the data is not the data of the overlap portion (S2508—NO), the input data becomes output data. The process is repeated until (S2513—NO) the number of input data reaches the number of data of the CIS 12.

When the number of input data reaches the number of data by one line of the CIS (S2513—YES), the data of the CIS 13 next to the input of the CIS 12 is input to the data buffer 1. After the number of input data is cleared (S2514), when the data is input to the data buffer 1, the number of input data is incremented (S2515), and whether the data is the data overlap portion with the CIS 12 is determined. In a case where the data is the data of the overlap portion (S2516—YES), mask data corresponding to the number of input data is selected (S2517), and the operation result of the data remaining in the data buffer 1 is handled as output data (S2518). In a case where the data is not data of the overlap portion (S2516—NO), the input data becomes output data (S2519). It is repeated until the number of input data becomes the number of data of the CIS 13 (S2013—NO).

When the number of input data becomes the number of data of the CIS 13 (S2013—YES), the data of all CISes are connected to create data of a single row, and thus when there is no termination instruction from the CPU 31 (S2021—NO), the process is performed returning to the head for of the process of the next row. This process is repeated. In a case where there is the termination instruction from the CPU 31 (S2021—YES), this becomes the termination row, and the process ends.

Figure 26A:
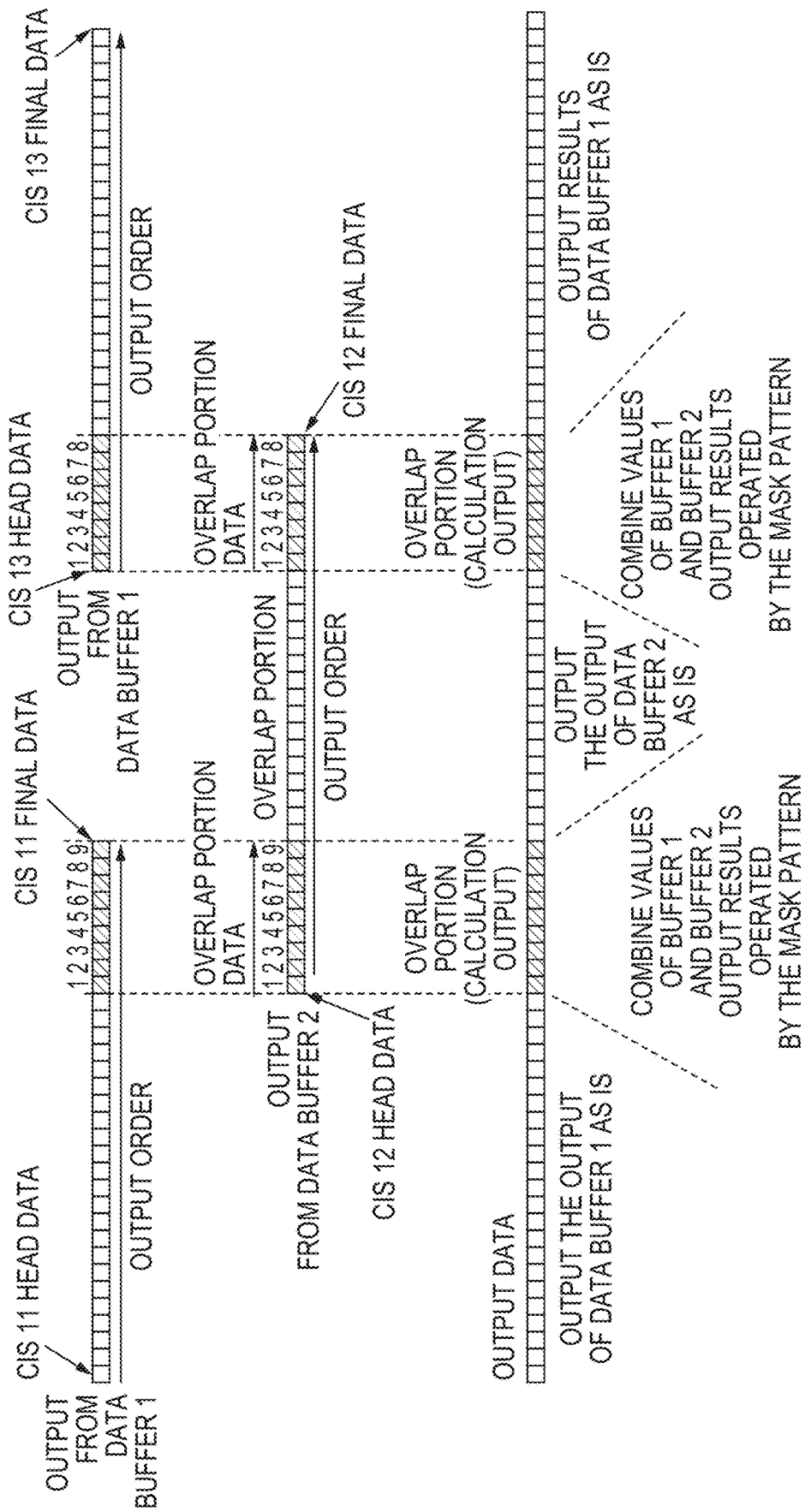

FIG. 26A is a diagram illustrating a relationship of data when the data of the CIS 11, the CIS 12, and the CIS 13 described in the flowcharts of FIGS. 25A and 25B are stored in the data buffer 1 and the data buffer 2, and connection data is created.

First, the output of the CIS 11 from the data buffer 1 is output as is, and when the overlap portion is reached, output is not performed, and data remains in the data buffer 1. When the output of data of the CIS 12 from the data buffer 2 starts, data remaining in the data buffer 1 and results operated in accordance with the coefficients corresponding to the respective data are handled as output data. When the output of the data of the overlap portion ends, the output of the data buffer 2 is output as is. Again, when the overlap portion of the data buffer 2 is reached, the output is not performed, and the data remains in the data buffer 2.

Subsequently, when the output of data of the CIS 13 from the data buffer 1 starts, data remaining in the data buffer 2 and results operated in accordance with the coefficients corresponding to the respective data are handled as output data. When the output of the data of the overlap portion ends, the output of the data buffer 1 is output as is. When the output of the data of the CIS 13 ends, data output by one row ends.

FIG. 26B is a diagram illustrating an example of connection mask coefficients (connection mask data) to connect the CIS 11 and the CIS 12. An example in which as the number of the overlap portion increases, the proportion of the CIS 12 increases is shown. FIG. 26C is a diagram illustrating an example of the connection mask coefficients to connect the CIS 12 and the CIS 13. This also shows an example in which as the number of the overlap portion increases, the proportion of the CIS 13 increases. The data after the connection process is input to a main-scanning direction reduction processing unit 334-5.

Figure 27:
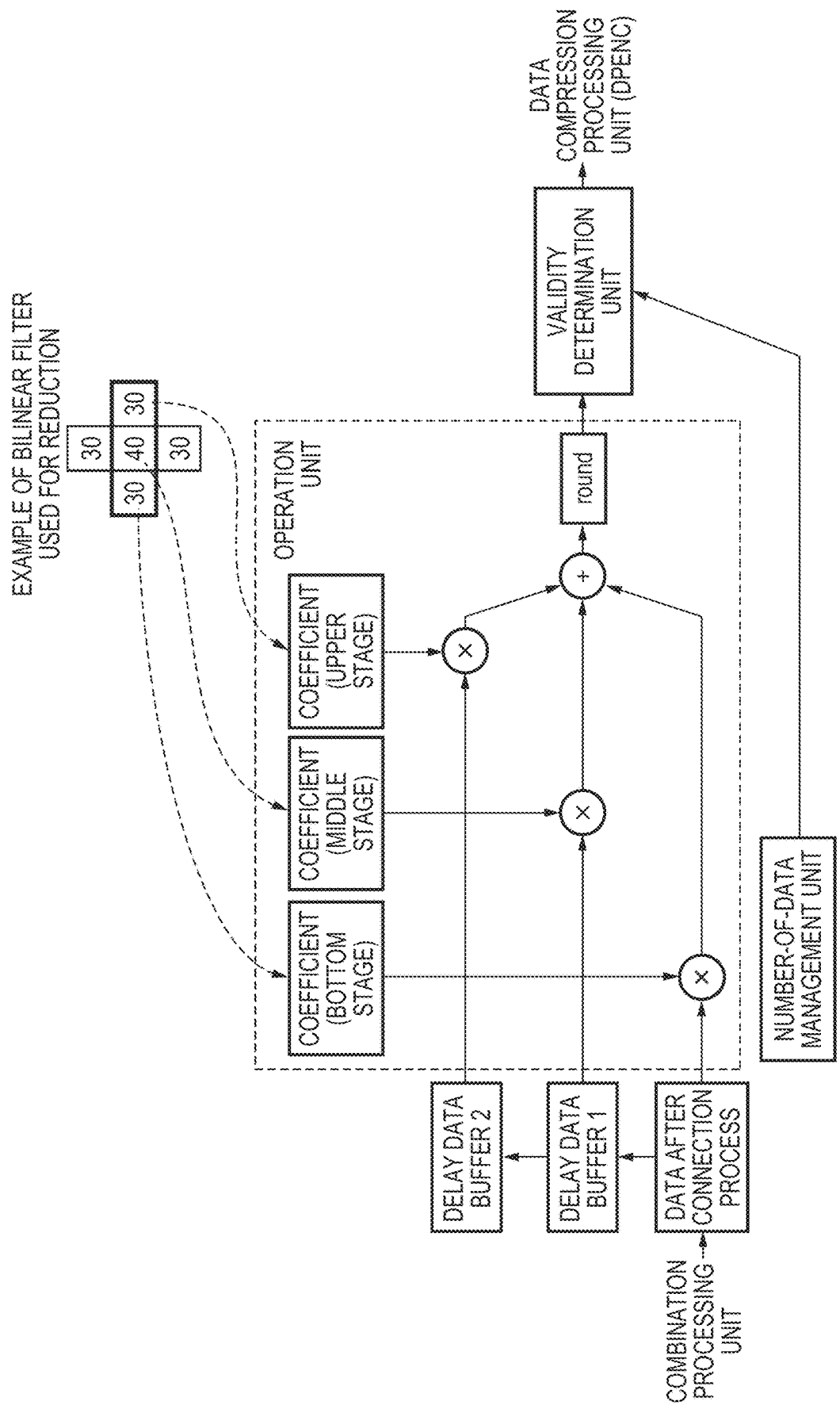
FIG. 27 is a diagram illustrating a configuration of a main-scanning direction reduction processing unit.

FIG. 27 is a diagram illustrating a configuration of the main-scanning direction reduction processing unit 334-5. The operation process of Formula (7) below is performed with the data after connection process, the delay buffer 1, the delay buffer 2, and coefficients in a horizontal direction of a bilinear filter used during reduction.

$$\text{Operation result} = (\text{read data} \times \text{coefficient1} + \text{delay buffer1} \times \text{coefficient2} + \text{delay buffer2} \times \text{coefficient3}) / (\text{coefficient1} + \text{coefficient2} + \text{coefficient3}) \quad \text{Formula (7).}$$

The number-of-data management unit counts processing data, the validity determination unit determines whether the output data is valid by the counting result, and only valid data is output.

Figure 28:
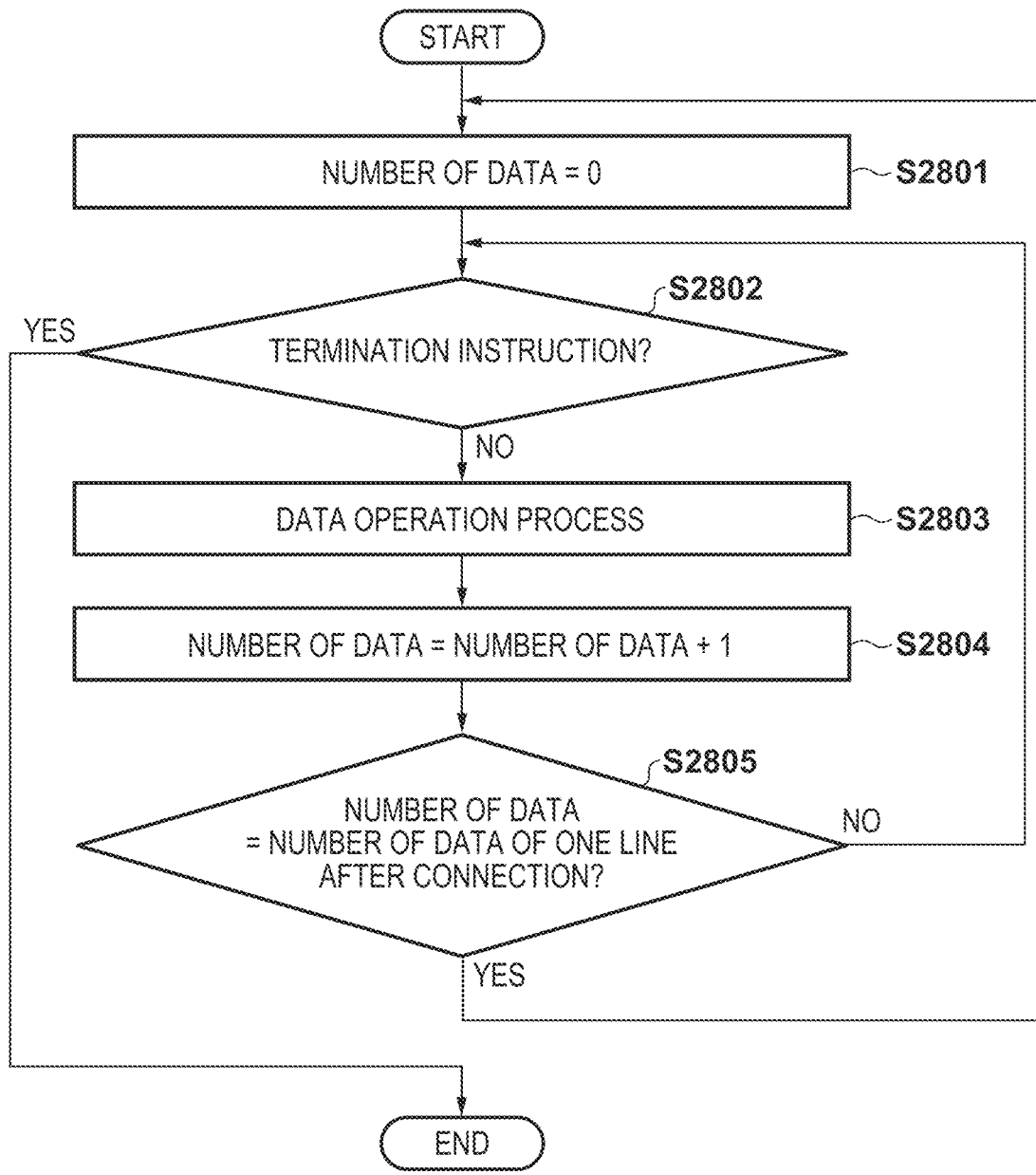
FIG. 28 is a flowchart depicting an operation of the number-of-data management unit of the main-scanning direction reduction processing unit.

FIG. 28 is a flowchart depicting the operation of the number-of-data management unit.

After the data is cleared (S2801) first, when there is no termination instruction from the CPU 31 (S2802—YES), the number of data is incremented (S2803) after the data operation process (S2802). The data operation process is repeated until the number of data reaches the number of data of one line after the connection process. When the number of data reaches the number of data of one line after the connection process, the process transitions to the process of the next row, and therefore the reduction processing is performed by repeating the process from clearing the number of data (S2801). When there is the termination instruction from the CPU 31 (S2802—YES), the process ends.

FIG. 29 is a flowchart depicting the operation of the data validity determination unit of the main-scanning direction reduction processing unit 334-5.

In the number-of-data management unit, in a case where the operated output data is present (S2901—YES) and the number of data rows is the number of filter stages or more (S2902—YES), the data is valid data (S2903). When the number of data rows is less than the number of filter stages (S2902—NO), it is treated as invalid data and not output (S2904). It is repeated until the termination instruction from the CPU 31 is present (S2905—YES).

Figure 30A:
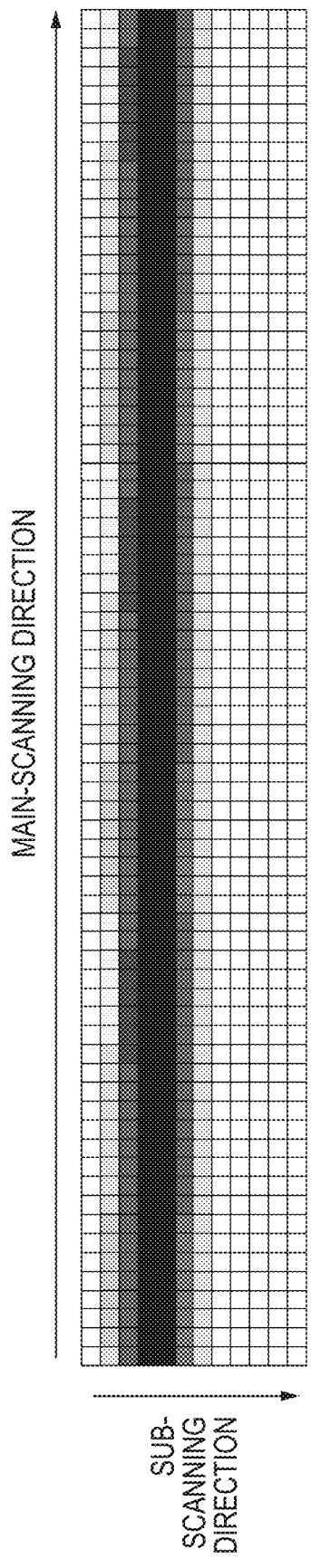
FIG. 30A and FIG. 30B are diagrams illustrating examples of data before main-scanning direction reduction processing and after the reduction processing.
Figure 30B:
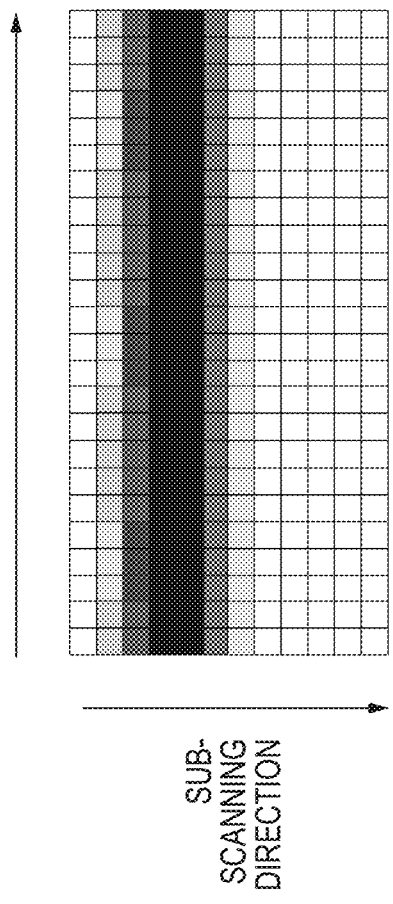

FIG. 30A illustrates an example of image data before the main-scanning direction reduction processing, and FIG. 30B illustrates an example of data after the main-scanning direction reduction processing. In both cases, the horizontal axis represents the image data in the main-scanning direction and the vertical axis represents the image data in the sub-scanning direction in a pseudo manner.

After the above processes are completed, a data compression processing unit 334-6 compresses the number of data bits as necessary, and after that the data writing unit 334-7 writes the data after the combination process to the memory, and thus data after the combining process is temporarily stored in the image memory 4.

As described above, in a case where the data of the plurality of CISes disposed in the staggered state are combined to generate an image, the process in the sub-scanning direction is performed on each of the CISes, and after that the main-scanning direction process is performed, thus ensuring efficient creation of the reduced image.

In the sub-scanning direction process, such as the sub-scanning direction reduction processing and the sub-scanning direction position correction process, the reduction processing is performed to reduce the number of data and the subsequent process is performed, and therefore, for example, a memory can be used efficiently.

Additionally, before the data after the sub-scanning direction process of the respective CISes are connected, position correction means and inclination correction means correct, for example, displacement of inclination between the CISes, thus ensuring connection as data in the same row. Therefore, further high quality data in the main-scanning direction can be created, and a high quality reduction processing can be performed.

Also, when the data in the main-scanning direction are joined, the conditions are the same in the main-scanning direction where the resolutions do not lower. Accordingly, the joining means needs not to consider the difference due to the resolution, and joining can be performed by one kind of means.

In the present embodiment, an example of using the three CISes has been described. However, even in a case where the number of CISes is increased, the similar process is possible by taking the similar configuration.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-003252, filed Jan. 12, 2022, which is hereby incorporated by reference herein in its entirety.

What is claimed is:

1. An image processing apparatus that performs processes of reducing read data from an image reading apparatus in a main-scanning direction and a sub-scanning direction orthogonal to the main-scanning direction, wherein
    the image reading apparatus includes a plurality of line image sensors having a longitudinal direction as the main-scanning direction disposed in the main-scanning direction, the plurality of line image sensors are displaced in the sub-scanning direction, and the image reading apparatus relatively moves the plurality of line image sensors and an original in the sub-scanning direction to read an image on the original, wherein
    the image processing apparatus comprises:
        a sub-scanning direction processing unit configured to perform reduction processing for each of the plurality of line image sensors in the sub-scanning direction; and
        a main-scanning direction processing unit configured to connect data after the reduction processing is performed for each of the plurality of line image sensors by the sub-scanning direction processing unit in the main-scanning direction and reduces the connected data in the main-scanning direction.

2. The image processing apparatus according to claim 1, wherein
    the sub-scanning direction processing unit corrects a positional displacement of less than one pixel in the sub-scanning direction for each of the line image sensors.

3. The image processing apparatus according to claim 2, wherein
    the sub-scanning direction processing unit corrects the positional displacement of less than one pixel in the sub-scanning direction using a number of pixels in the main-scanning direction and a filter coefficient corresponding to a displacement amount in the sub-scanning direction.

4. The image processing apparatus according to claim 3, wherein
the sub-scanning direction processing unit performs the reduction processing in the sub-scanning direction and then corrects the positional displacement of less than one pixel in the sub-scanning direction.

5. The image processing apparatus according to claim 1, wherein
the main-scanning direction processing unit performs inclination correction for displacement of one pixel or more in the sub-scanning direction on data on which the reduction processing in the sub-scanning direction has been performed for each of the plurality of line image sensors.

6. The image processing apparatus according to claim 5, wherein
the main-scanning direction processing unit performs the inclination correction and then connects respective data in the main-scanning direction to be a same line.

7. The image processing apparatus according to claim 5, wherein
the main-scanning direction processing unit performs the inclination correction on the data stored in a storage device by changing a reading order of the data from a position where the displacement of one or more pixels occurs in the sub-scanning direction, the reduction processing in the sub-scanning direction being performed on the data.

8. The image processing apparatus according to claim 1, wherein
the main-scanning direction processing unit calculates data for performing connection for pixels having overlapped read positions between the plurality of line image sensors using respective corresponding coefficients.

9. The image processing apparatus according to claim 1, wherein
the sub-scanning direction processing unit includes a sub-scanning direction reduction processing circuit, a sub-scanning direction position correction processing circuit, and a processing circuit, and the processing circuit adjusts a difference in each of the plurality of line image sensors.

10. The image processing apparatus according to claim 1, wherein
the main-scanning direction processing unit includes an inclination correction processing circuit, a processing circuit, a combination processing circuit, and a main-scanning direction reduction processing circuit, and the processing circuit adjusts a difference in each of the plurality of line image sensors.

11. An image reading apparatus, comprising:
a reading unit configured to include a plurality of line image sensors having the longitudinal direction as the main-scanning direction in the main-scanning direction, the plurality of line image sensors being displaced in the sub-scanning direction orthogonal to the main-scanning direction, the reading unit relatively moving the plurality of line image sensors and an original in the sub-scanning direction to read an image on the original; and
the image processing apparatus according to claim 1.

12. An image processing method that performs processes of reducing read data from an image reading apparatus in a main-scanning direction and a sub-scanning direction orthogonal to the main-scanning direction, wherein
the image reading apparatus includes a plurality of line image sensors having a longitudinal direction as the main-scanning direction disposed in the main-scanning direction, the plurality of line image sensors are displaced in the sub-scanning direction, and the image reading apparatus relatively moves the plurality of line image sensors and an original in the sub-scanning direction to read an image on the original, wherein
the image processing method comprises:
performing a sub-scanning direction process that performs reduction processing for each of the plurality of line image sensors in the sub-scanning direction; and
performing a main-scanning direction process that connects data after the reduction processing is performed for each of the plurality of line image sensors in the sub-scanning direction process in the main-scanning direction and reduces the connected data in the main-scanning direction.

13. A non-transitory computer-readable storage medium that stores a program for causing a computer to execute respective processes of an image processing method that performs processes of reducing read data from an image reading apparatus in a main-scanning direction and a sub-scanning direction orthogonal to the main-scanning direction, wherein
the image reading apparatus includes a plurality of line image sensors having a longitudinal direction as the main-scanning direction disposed in the main-scanning direction, the plurality of line image sensors are displaced in the sub-scanning direction, and the image reading apparatus relatively moves the plurality of line image sensors and an original in the sub-scanning direction to read an image on the original, wherein
the image processing method comprises:
performing a sub-scanning direction process that performs reduction processing for each of the plurality of line image sensors in the sub-scanning direction; and
performing a main-scanning direction process that connects data after the reduction processing is performed for each of the plurality of line image sensors in the sub-scanning direction process in the main-scanning direction and reduces the connected data in the main-scanning direction.

* * * * *